(12) United States Patent
Kim

(10) Patent No.: US 12,383,811 B2
(45) Date of Patent: Aug. 12, 2025

(54) DISPLAY APPARATUS AND OPERATING METHOD OF THE SAME

(71) Applicant: SAMSUNG ELECTRONICS CO., LTD., Suwon-si (KR)

(72) Inventor: Hyungrae Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 339 days.

(21) Appl. No.: 17/942,025

(22) Filed: Sep. 9, 2022

(65) Prior Publication Data

US 2023/0226431 A1 Jul. 20, 2023

Related U.S. Application Data

(63) Continuation of application No. PCT/KR2022/012662, filed on Aug. 24, 2022.

(30) Foreign Application Priority Data

Jan. 14, 2022 (KR) .................. 10-2022-0006043

(51) Int. Cl.
*G06V 10/00* (2022.01)
*A63B 24/00* (2006.01)
(Continued)

(52) U.S. Cl.
CPC ...... *A63B 71/0622* (2013.01); *A63B 24/0062* (2013.01); *A63B 24/0075* (2013.01); (Continued)

(58) Field of Classification Search
CPC ............ A63B 24/0062; A63B 24/0075; A63B 2220/05; A63B 2220/807; A63B 2230/62; (Continued)

(56) References Cited

U.S. PATENT DOCUMENTS 10,898,755 B2    1/2021   Kang
10,931,880 B2    2/2021   Byeon et al.
(Continued)

FOREIGN PATENT DOCUMENTS

CN    108470147 A  *  8/2018   .......... G05D 1/0246
JP       5317534 B2  * 10/2013
(Continued)

OTHER PUBLICATIONS

PCT International Search Report dated Nov. 29, 2022 for PCT/KR2022/012662.
(Continued)

*Primary Examiner* — Vu Le
*Assistant Examiner* — Zaid Muhammad Saleh
(74) *Attorney, Agent, or Firm* — Nixon & Vanderhye P.C.

(57) ABSTRACT

A display apparatus may include: a camera; a display; a memory storing one or more instructions; and at least one processor configured to execute the one or more instructions stored in the memory to: analyze an image captured by the
(Continued)

camera and detect a free space included in the image; determine an exercise motion performable in the free space, based on the detected free space; and control the display to output exercise content based on the determined exercise motion.

22 Claims, 18 Drawing Sheets

(51) Int. Cl.
    *A63B 71/06*     (2006.01)
    *G06V 10/82*     (2022.01)
    *G06V 20/50*     (2022.01)
    *G06V 20/52*     (2022.01)
    *G06V 40/10*     (2022.01)
    *H04N 7/18*     (2006.01)

(52) U.S. Cl.
    CPC .............. *G06V 10/82* (2022.01); *G06V 20/50* (2022.01); *G06V 20/52* (2022.01); *G06V 40/10* (2022.01); *A63B 2220/05* (2013.01); *A63B 2220/807* (2013.01); *A63B 2230/62* (2013.01); *H04N 7/188* (2013.01)

(58) Field of Classification Search
    CPC .......... A63B 24/0003; A63B 2220/806; G06V 10/82; G06V 20/50; G06V 10/74; G06V 40/23
    See application file for complete search history.

(56) References Cited

U.S. PATENT DOCUMENTS

2019/0077007 A1    3/2019    Mallinson
2020/0204736 A1    6/2020    Byeon et al.
2021/0093920 A1    4/2021    Poulin et al.

FOREIGN PATENT DOCUMENTS

| JP | 2020-534041 A | 11/2020 |
| JP | 2010-233737 A | 10/2021 |
| KR | 10-2020-0069899 A | 6/2020 |
| KR | 10-2020-0077775 A | 7/2020 |
| KR | 10-2173553 | 10/2020 |
| KR | 10-2021-0003627 A | 1/2021 |
| KR | 10-2255067 | 5/2021 |
| KR | 10-2021-0076539 A | 6/2021 |
| KR | 10-2021-0102622 A | 8/2021 |
| KR | 20210102622 A * | 8/2021 |
| KR | 10-2320960 B1 | 10/2021 |

OTHER PUBLICATIONS

Extended European Search Report dated Jan. 27, 2025 for EP Application No. 22920752.7.

* cited by examiner

FIG. 13
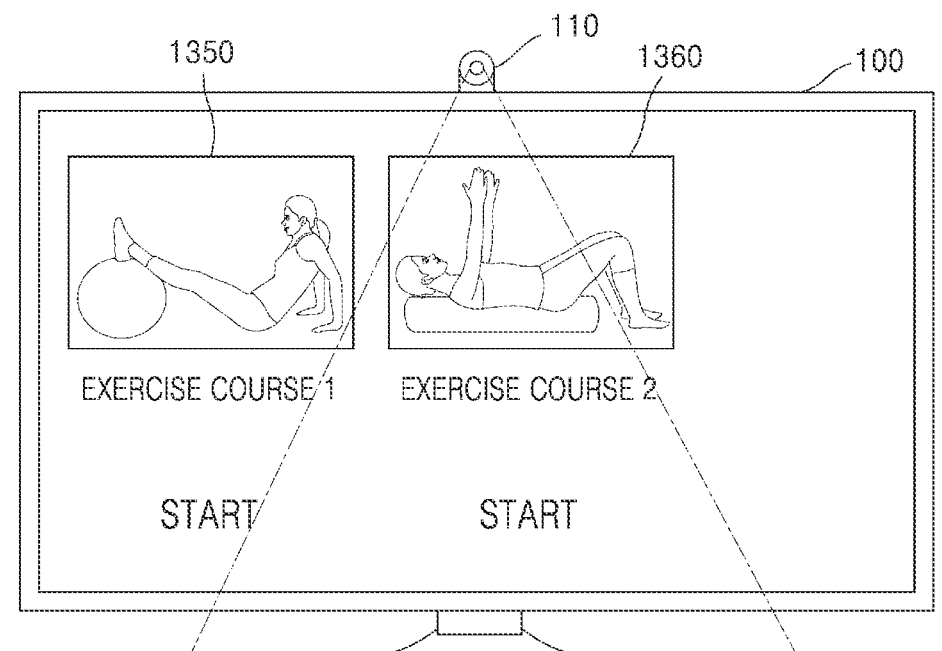
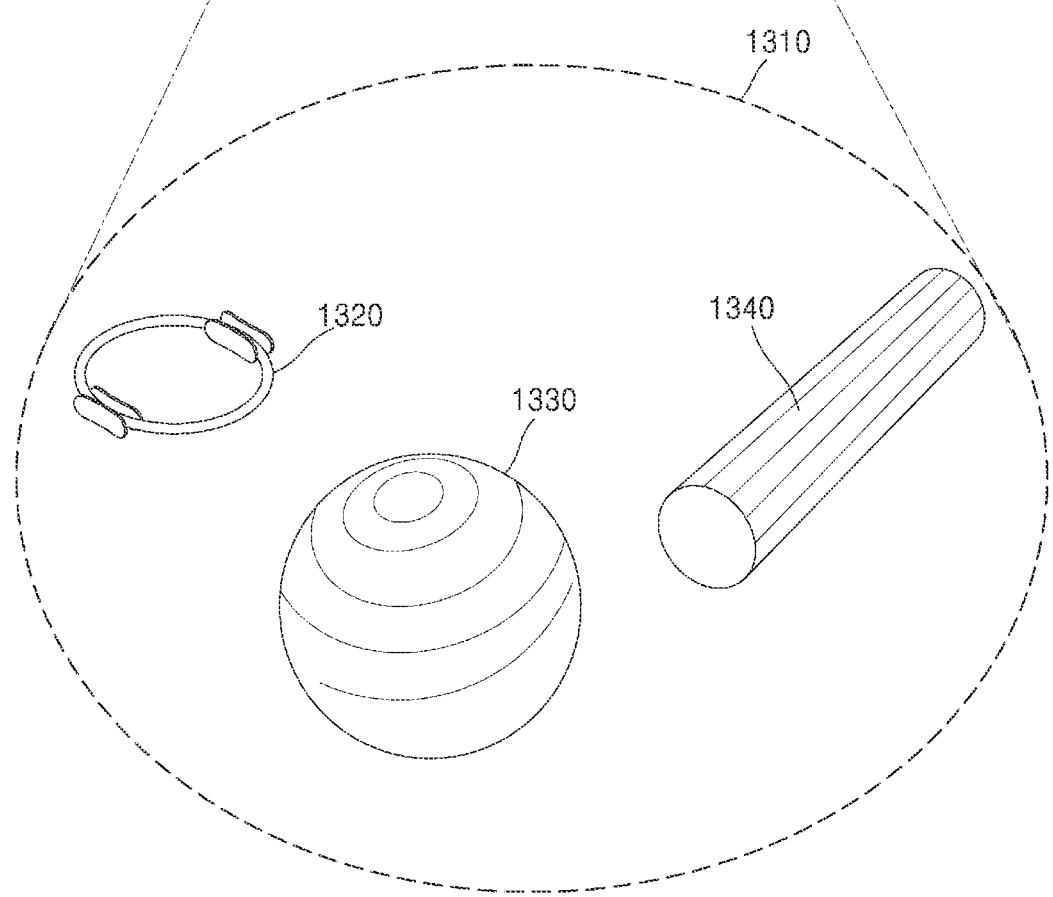

FIG. 15
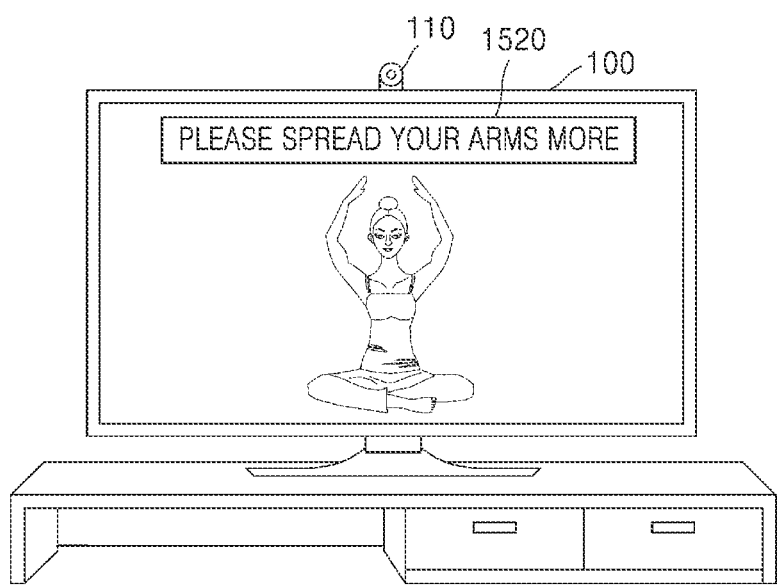
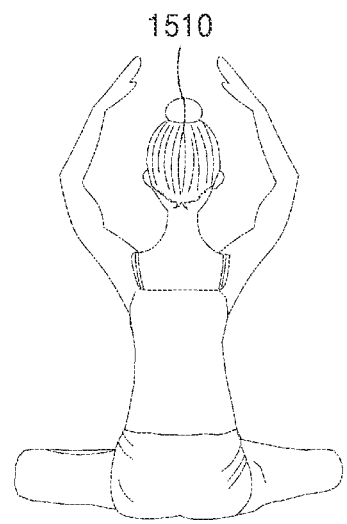

DISPLAY APPARATUS AND OPERATING METHOD OF THE SAME

CROSS-REFERENCE TO RELATED APPLICATIONS

This application is a national stage application of International Application No. PCT/KR2022/012662 designating the United States, filed on Aug. 24, 2022, in the Korean Intellectual Property Receiving Office and claiming priority to Korean Patent Application No. 10-2022-0006043, filed on Jan. 14, 2022 in the Korean Intellectual Property Office, the disclosures of which are incorporated by reference herein in their entireties.

TECHNICAL FIELD

Various example embodiments relate to a display apparatus and/or an operating method of the same. For example, certain example embodiments relate to a display apparatus for providing a home training service, and/or an operating method of the display apparatus.

BACKGROUND

Recently, various home training systems have emerged in line with the non-contact era. In contrast to services of the related art that simply provide home training videos and have users follow them, services such as analyzing users' exercise tendencies based on AI technology to provide appropriate exercise courses or analyzing users' body types to provide appropriate exercise courses are currently being launched actively.

Meanwhile, home training services of the related art provide exercise guidance in consideration of only the users' exercise tendencies or body types and do not consider surrounding environments in which the users exercise. In general, home training is mostly carried out indoors where various objects, for example, couches, tables, children's toys, etc. are present. When home training is carried out in such an environment, due to space limitations, a user may not be able to follow exercise motions guided by a service, and the user may get injured by bumping into a nearby object.

SUMMARY

Various embodiments may provide a display apparatus for providing exercise content in consideration of free space surrounding a user and/or providing guide information that induces the user to secure additional free space to perform exercise motions, and/or an operating method of the display apparatus.

According to an example embodiment, a display apparatus may include: a camera; a display; a memory storing one or more instructions; and a processor configured to execute the one or more instructions stored in the memory to: detect a free space included in an image captured by the camera by analyzing the image; determine an exercise motion performable in the free space, based on the detected free space; and control the display to output exercise content based on the determined exercise motion.

According to an example embodiment, the processor may be configured to execute the one or more instructions stored in the memory to control the camera to capture an image based on an input for executing an exercise application or a user input for selecting an exercise course.

According to an example embodiment, the processor may be configured to D receive a user input for selecting an exercise course, and determine an exercise motion performable in the detected free space, from among exercise motions included in the exercise course selected based on the user input.

According to an example embodiment, the processor may be configured to execute the one or more instructions stored in the memory to detect the user in the image captured by the camera, and/or detect the free space surrounding the user in the image based on the detecting of the user.

According to an example embodiment, the processor may be further configured to execute the one or more instructions stored in the memory to detect the free space included in the captured image, by using a neural network.

According to an example embodiment, the processor may be configured to execute the one or more instructions stored in the memory to, when there is no exercise motion performable in the detected free space or a number of exercise motions performable is less than a preset number, control the display to display a guide screen for securing an additionally required space.

According to an example embodiment, the guide screen may include an image in which the detected free space and the additionally required space are displayed in an image indicating an actual space whose image is captured by the camera.

According to an example embodiment, the processor may be configured to execute the one or more instructions stored in the memory to, when there is no exercise motion performable in the detected free space or the number of the exercise motion performable is less than the preset number, control the camera to capture an image at a certain interval, and, when a free space detected in the image captured by the camera at the certain interval includes the additionally required space, reproduce the exercise content.

According to an example embodiment, the processor may be configured to execute the one or more instructions stored in the memory to determine an exercise course including the determined exercise motion, and control the display to display information about the determined exercise course.

According to an example embodiment, the processor may be configured to execute the one or more instructions stored in the memory to receive an image of a user, the image being captured by the camera, obtain body type information about the user based on the image of the user, select an exercise course based on the body type information about the user, and determine an exercise motion performable in the detected free space, from among exercise motions included in the selected exercise course.

According to an example embodiment, the processor may be configured to execute the one or more instructions stored in the memory to control the display to output the exercise content, receive an image of a user while the exercise content is output, the image being captured by the camera, analyze a posture or a motion of the user based on the image of the user, and provide coaching information based on a result of the analyzing of the posture or the motion of the user.

According to an example embodiment, an operating method of a display apparatus may include: receiving an image captured by a camera; detecting a free space included in the image; determining an exercise motion performable in the free space, based on the detected free space; and providing exercise content based on the determined exercise motion.

According to one or more example embodiments, a display apparatus may detect free space surrounding a user and/or provide a home training service based on the detected free space. Accordingly, even when there is not enough free space surrounding the user, it is possible to provide more suitable exercise content to the user and prevent or reduce injury to the user in certain example embodiments.

BRIEF DESCRIPTION OF DRAWINGS

The above and other aspects, features, and advantages of certain embodiments of the present disclosure will be more apparent from the following detailed description, taken in conjunction with the accompanying drawings, in which:

FIG. 13 is a diagram for describing an operation of a display apparatus, according to an example embodiment.

FIG. 15 is a diagram referred to in the descriptions of FIG. 14.

DETAILED DESCRIPTION

Figure 1:
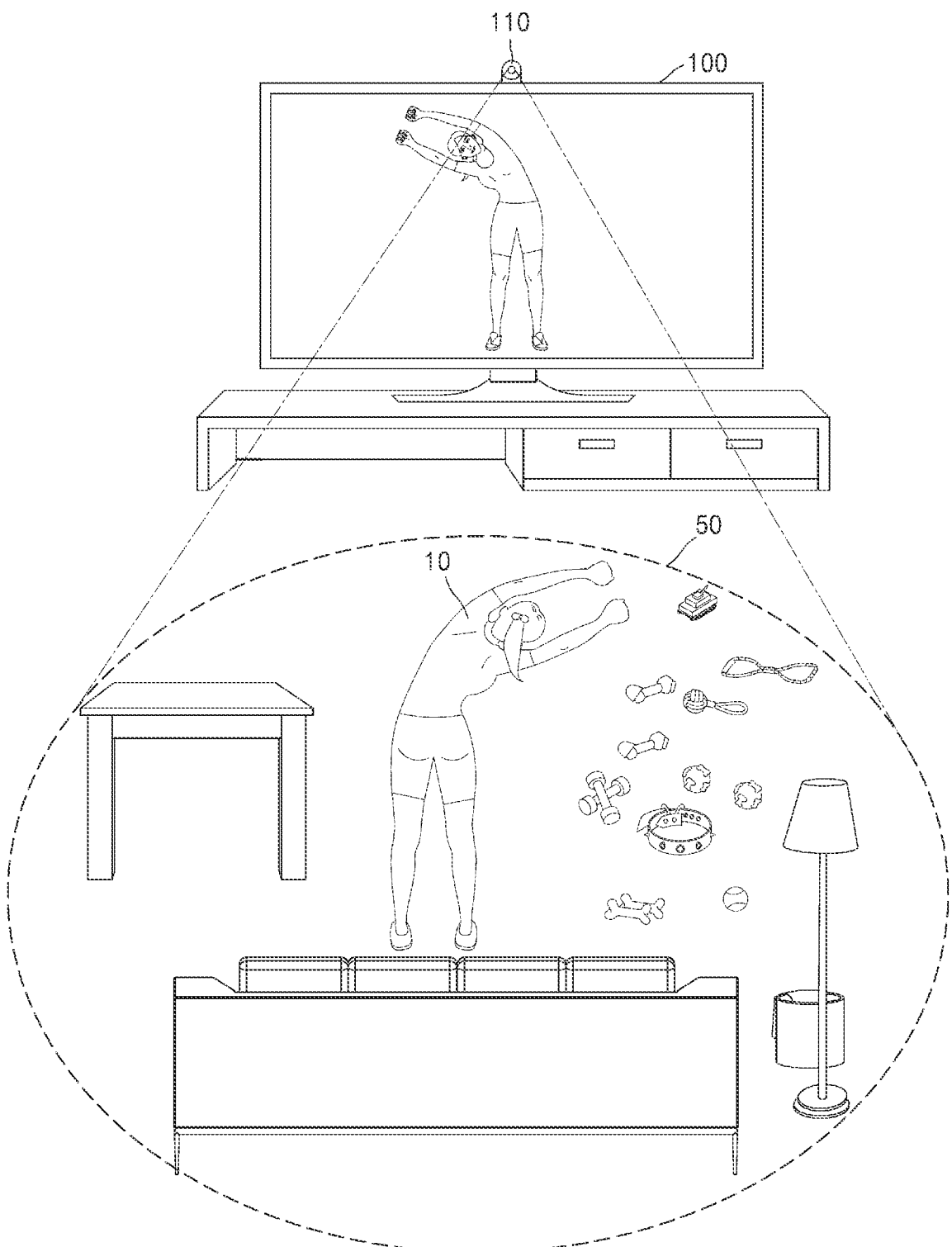
FIG. 1 is a diagram illustrating a display apparatus according to an example embodiment.

Throughout the disclosure, the expression "at least one of a, b or c" indicates only a, only b, only c, both a and b, both a and c, both b and c, all of a, b, and c, or variations thereof.

Hereinafter, the terms used in the specification will be briefly described, and then the disclosure will be described in detail.

The terms used in the disclosure are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the disclosure should be understood not as simple names but based on the meaning of the terms and the overall description of the disclosure.

The term "include (or including)" or "comprise (or comprising)" is inclusive or open-ended and does not exclude additional, unrecited components or method steps. In addition, terms such as " . . . er/or", " . . . module", or the like refer to units that perform at least one function or operation, and the units may be implemented as hardware or software or as a combination of hardware and software.

Also, the expression "at least one of A, B or C" may mean any one of 'A', 'B', 'C', 'A and B', 'A and C', 'B and C', or 'A, B, and C'.

Hereinafter, the disclosure will now be described more fully with reference to the accompanying drawings, in which embodiments of the disclosure are shown such that those of ordinary skill in the art may easily work the disclosure. This disclosure may, however, be embodied in many different forms and should not be construed as limited to the embodiments of the disclosure set forth herein. In addition, portions irrelevant to the description of the disclosure will be omitted in the drawings for a clear description of the disclosure, and like reference numerals will denote like components throughout the specification.

In the embodiments of the disclosure, the term "user" may refer to a person who controls a function or an operation of a display apparatus 100. Alternatively, the term "user" may include a viewer who watches content displayed on the display apparatus 100 and may include an administrator or an installation engineer.

Also, the term 'image' or 'picture' may refer to a still image, a moving image including a plurality of consecutive still images (or frames), or a video.

FIG. 1 is a diagram illustrating a display apparatus according to an embodiment.

Referring to FIG. 1, according to an embodiment, the display apparatus 100 may be a television (TV), but the TV is merely an example and the display apparatus 100 may be implemented in various forms including a display. For example, the display apparatus 100 may be implemented as various types of electronic apparatuses, such as a mobile phone, a tablet personal computer (PC), a digital camera, a camcorder, a laptop computer, a desktop computer, an e-book reader, a digital broadcast receiver, a personal digital assistant (PDA), a portable multimedia player (PMP), a navigation system, an MP3 player, and a wearable device. The display apparatus 100 may be a stationary electronic apparatus provided at a fixed location or a mobile electronic apparatus carriable by a user, or may be a digital broadcast receiver capable of receiving a digital broadcast signal. In particular, the embodiments may be easily implemented in a display apparatus having a large display, such as a TV, but are not limited thereto.

The display apparatus 100 may be implemented not only as a flat display apparatus but also implemented as a curved display apparatus having a curvature or a flexible display apparatus having an adjustable curvature. An output resolution of the display apparatus 100 may include, for example, high definition (HD), full HD (FHD), ultra HD (UHD), or a resolution higher than UHD.

According to an embodiment, the display apparatus 100 may provide a home training service. The home training service may refer to a service for allowing a user 10 to follow exercise motions included in content while watching the content reproduced by the display apparatus 100. For example, the display apparatus 100 may reproduce or output image content or video content for guiding exercise motions, and the user 10 may follow exercise motions guided by the image content or the video content reproduced or output on the display apparatus 100.

According to an embodiment, the home training service may be referred to as a 'home fitness service', a 'home gym service', a 'personal training service', etc., but is not limited thereto.

The home training service may be provided through a home training application installed in the display apparatus 100. The home training application may be implemented as at least one instruction or program for executing the home training service. The home training application may be installed and stored in a processor or an internal memory of the display apparatus 100 during production of the display apparatus 100. Alternatively, the home training application may be externally produced and distributed to the display apparatus 100. In detail, the home training application may be electronically distributed through an electronic market, such as an application store, or a manufacturer of the display apparatus 100.

The home training application may be executed according to a request or a setting of the user 10. For example, the display apparatus 100 may receive a user input for requesting execution of the home training application. When the request for the execution of the home training application is received, the display apparatus 100 may execute the home training application and provide the home training service.

As illustrated in FIG. 1, according to an embodiment, the display apparatus 100 may display an image in which a trainer performs an exercise motion, and the user 10 may follow the exercise motion while watching the image. In this case, depending on a state of a space surrounding the user 10, the user 10 may not be able to follow the exercise motion performed by the trainer. For example, in a case where the trainer performs the exercise motion while lying down in the image, when there is not enough free space surrounding the user 10, the user 10 is not able to follow the exercise motion to be performed while lying down.

Accordingly, according to an embodiment, the display apparatus 100 may provide exercise content or provide guide information for securing a space in consideration of the free space surrounding the user 10.

According to an embodiment, the display apparatus 100 may include a camera 110 or may be connected (directly or indirectly) to the camera 110 wirelessly or by wire.

The display apparatus 100 may capture an image of a space 50 in which the user 10 exercises by using the camera 110.

The display apparatus 100 may detect a free space included in the image 50 by analyzing the image captured by the camera 110 and may determine one or more exercise motions performable in the free space based on the detected free space. The display apparatus 100 may provide exercise content based on the determined exercise motions to the user 10.

For example, when the detected free space is small, the display apparatus 100 may provide exercise content including exercise motions to be performed while standing up. On the other hand, when the free space is large, the display apparatus 100 may provide exercise content including exercise motions to be performed while lying down as well as exercise motions to be performed while standing up. However, the disclosure is not limited thereto.

Also, when there is no exercise motion performable in the free space or the number of performable exercise motions is less than a preset number, the display apparatus 100 may provide the user 10 with guide information that causes the user 10 to secure an additionally required space. The user 10 may secure a space required for exercise with reference to the guide information provided by the display apparatus 100.

Accordingly, according to an embodiment, the display apparatus 100 may provide an exercise guide image or provide guide information for securing a space in consideration of the free space surrounding the user 10, and thus may provide a home training service suitable for the user 10 and prevent or reduce injury that may occur during exercise.

Hereinafter, a method by which the display apparatus 100 provides exercise content or provides guide information for securing a space based on a free space surrounding a user, according to an embodiment, will be described in detail with reference to the accompanying drawings.

Figure 2:
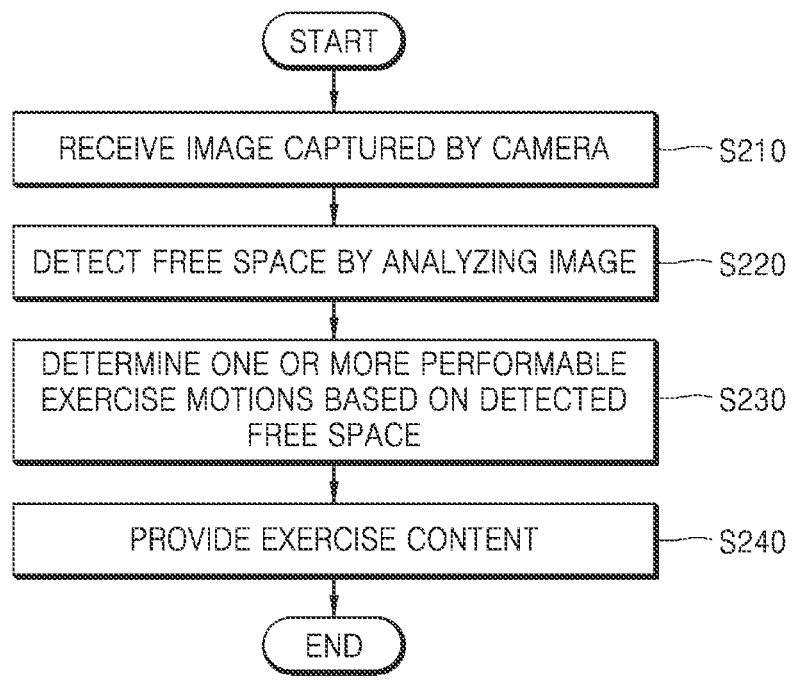
FIG. 2 is a flowchart illustrating an operating method of an example display apparatus.

FIG. 2 is a flowchart illustrating an operating method of a display apparatus.

Referring to FIG. 2, according to an embodiment, the display apparatus 100 may receive an image captured by a camera (S210).

For example, the display apparatus 100 may include a camera or may be connected to the camera wirelessly or by wire. The display apparatus 100 may obtain an image, captured by the camera, of a space within a preset range. In this case, a location and a size of the space whose image is captured may be determined according to a location and an angle-of-view of the camera, and the space whose image is captured may be a space located in front of the display apparatus 100, but is not limited thereto. Also, the display apparatus 100 may obtain images, captured by a plurality of cameras, of the space.

The display apparatus 100 may capture an image of the space based on a home training application execution input or a user input for selecting an exercise course. Also, the display apparatus 100 may detect a user in the image captured by the camera, and when the user is detected, may obtain an image, which is captured, of a space surrounding the user. However, the disclosure is not limited thereto.

The display apparatus 100 may detect a free space included in the image by analyzing the image (S220).

The display apparatus 100 may detect the free space included in the image by using a saliency detection method. Alternatively, the display apparatus 100 may detect objects included in the image by using a deep neural network (DNN)-based single shot detection (SSD) method, a depth estimation method, etc., and may detect a free space included in the image based on the detected objects. Alternatively, the display apparatus 100 may segment the image and detect the free space based on segmented areas. However, the disclosure is not limited thereto, and the display apparatus 100 may detect the free space included in the image by using various well-known methods.

The display apparatus 100 may determine, based on the detected free space, one or more exercise motions performable in the detected free space (S230).

According to an embodiment, the home training service may provide a plurality of pieces of exercise content corresponding to a plurality of exercise courses (e.g., see S240 in FIG. 2). In this case, an exercise course includes one or more exercise motions, and may refer to a series of exercise processes configured to repeat each of the included exercise motions a preset number of times. For example, the exercise courses may include a lower body strengthening course, an upper body strengthening course, an abdominal muscle strengthening course, a diet course, a stretching course, an aerobic course, a muscle strengthening course, etc. However, the disclosure is not limited thereto.

Also, each exercise course may include various exercise motions. For example, the lower body strengthening course may include a squat motion, a lunge motion, and a plank motion, and the abdominal muscle strengthening course may include a crunch motion, a plank motion, and a leg raise motion. However, the disclosure is not limited thereto.

According to an embodiment, the display apparatus 100 may determine exercise motions performable in the detected free space, from among exercise motions included in the selected exercise course.

For example, when the lower body strengthening course is selected, the display apparatus 100 may determine whether each of the squat, lunge, and plank motions included in the lower body strengthening course is performable, based on a location and a size of the detected free space.

According to an embodiment, the display apparatus 100 may provide exercise content based on the exercise motions determined to be performable. For example, when only squat and lunge motions are performable in the detected free space among the exercise motions included in the lower body strengthening course, and there is not enough space to perform the plank motion, the display apparatus 100 may provide exercise content including images for guiding the squat and lunge motions.

Alternatively, when no exercise course is selected, the display apparatus 100 may select an exercise course including only exercise motions performable in the detected free space, from among the plurality of exercise courses, and may provide the user with exercise content corresponding to the selected exercise course.

The exercise content may provide an image for guiding exercise motions included in a corresponding exercise course, names of the exercise motions, information about effects of the exercise motions, information about the number of times the exercise motions are performed, information about a time for which the exercise motions are performed, etc. However, the disclosure is not limited thereto.

Each embodiment herein may be used in combination with any other embodiment described herein.

Figure 3:
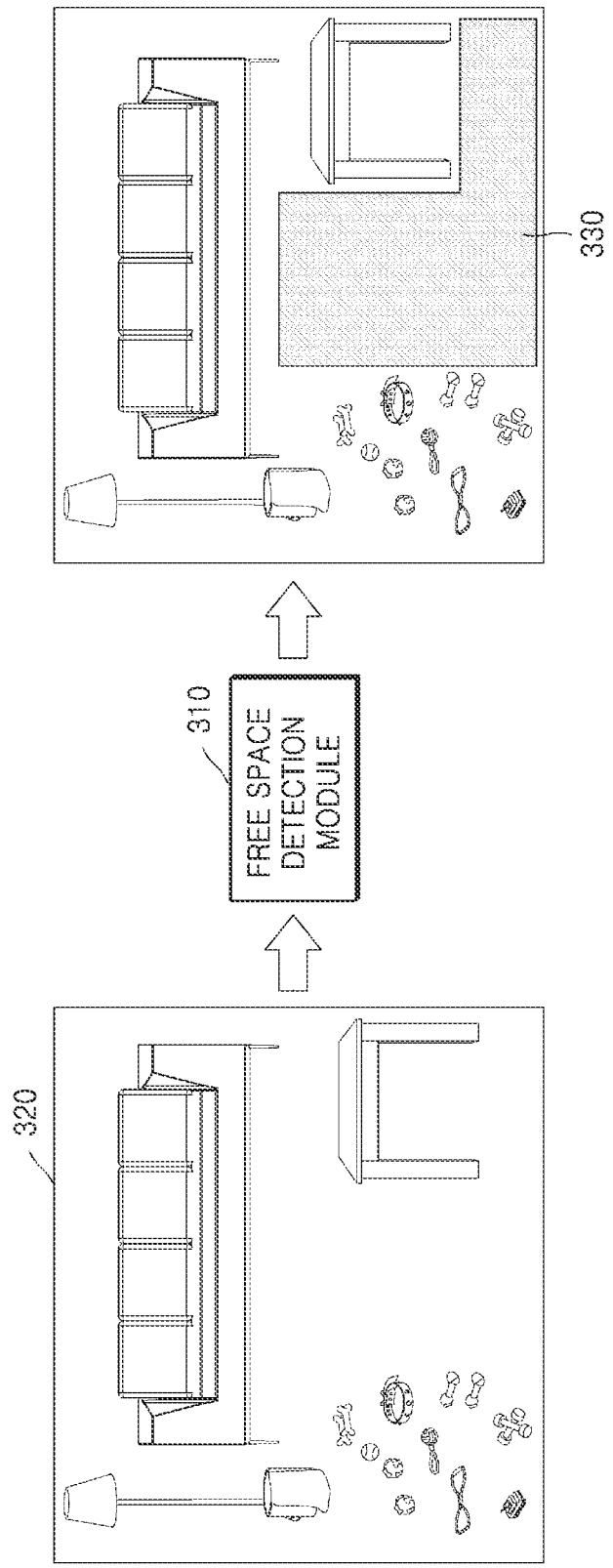
FIG. 3 is a diagram illustrating an operation of a module for performing a function of detecting a free space, according to an example embodiment.

FIG. 3 is a diagram illustrating an operation of a module for performing a function of detecting a free space, according to an embodiment. The module for performing a function of detecting a free space may be included as a part of the display apparatus illustrated in FIG. 1.

Referring to FIG. 3, according to an embodiment, a free space detection module 310 may include appropriate logic, circuitry, interface, and/or code for detecting a free space 330 included in an image 320 captured by a camera.

According to an embodiment, because the free space refers to a space for a user to perform an exercise motion, it may refer to an empty space or area located on the floor among spaces included in the image 320, but is not limited thereto. Each "module" herein may comprise circuitry.

The free space detection module 310 may detect the free space 330 included in the image 320 by using the saliency detection method. Alternatively, the free space detection module 310 may detect objects included in the image 320 by using the DNN-based SSD method, the depth estimation method, etc. and may detect the free space 330 included in the image 320 based on the detected objects. Alternatively, the free space detection module 310 may segment the image 320 and detect the free space 330 based on segmented areas. However, the disclosure is not limited thereto, and the free space detection module 310 may detect the free space 330 included in the image 320 by using various well-known methods.

Figure 4:
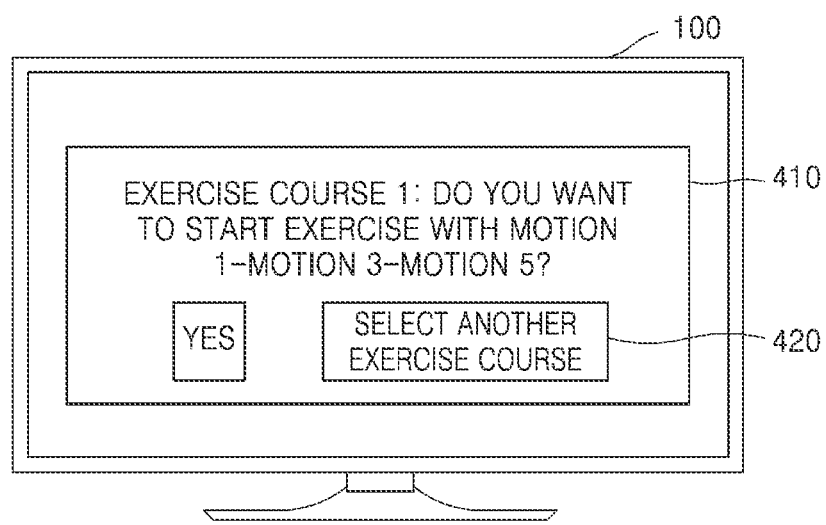
FIG. 4 is a diagram illustrating an example of a user interface screen displayed on a display apparatus, according to an example embodiment.

FIG. 4 is a diagram illustrating an example of a user interface screen displayed on a display apparatus, according to an embodiment.

According to an embodiment, the display apparatus 100 may select any one of a plurality of exercise courses provided by a home training service. For example, the display apparatus 100 may select an exercise course based on a user input or may automatically select an exercise course based on an exercise history of a user or body type information about the user. However, the disclosure is not limited thereto.

When the exercise course is selected, the display apparatus 100 may detect a free space based on an image captured by a camera. Because this has been described in detail with reference to FIG. 3, repeated descriptions thereof are not provided again.

The display apparatus 100 may determine whether exercise motions included in the selected exercise course are performable in the detected free space. For example, an exercise course 1 is selected, the display apparatus 100 may determine whether exercise motions included in the exercise course 1 are performable in the detected free space, and may determine that a motion 1, a motion 3, and a motion 5 are performable. The display apparatus 100 may display, on a screen, a message 410 asking whether to reproduce exercise content composed of the motion 1, the motion 3, and the motion 5, which are performable in the detected free space. Also, the display apparatus 100 may display, on the screen, an object 420 for selecting another exercise course.

Accordingly, the user may reproduce the exercise content composed of the motion 1, the motion 3, and the motion 5 or select the other exercise course.

Figure 5:
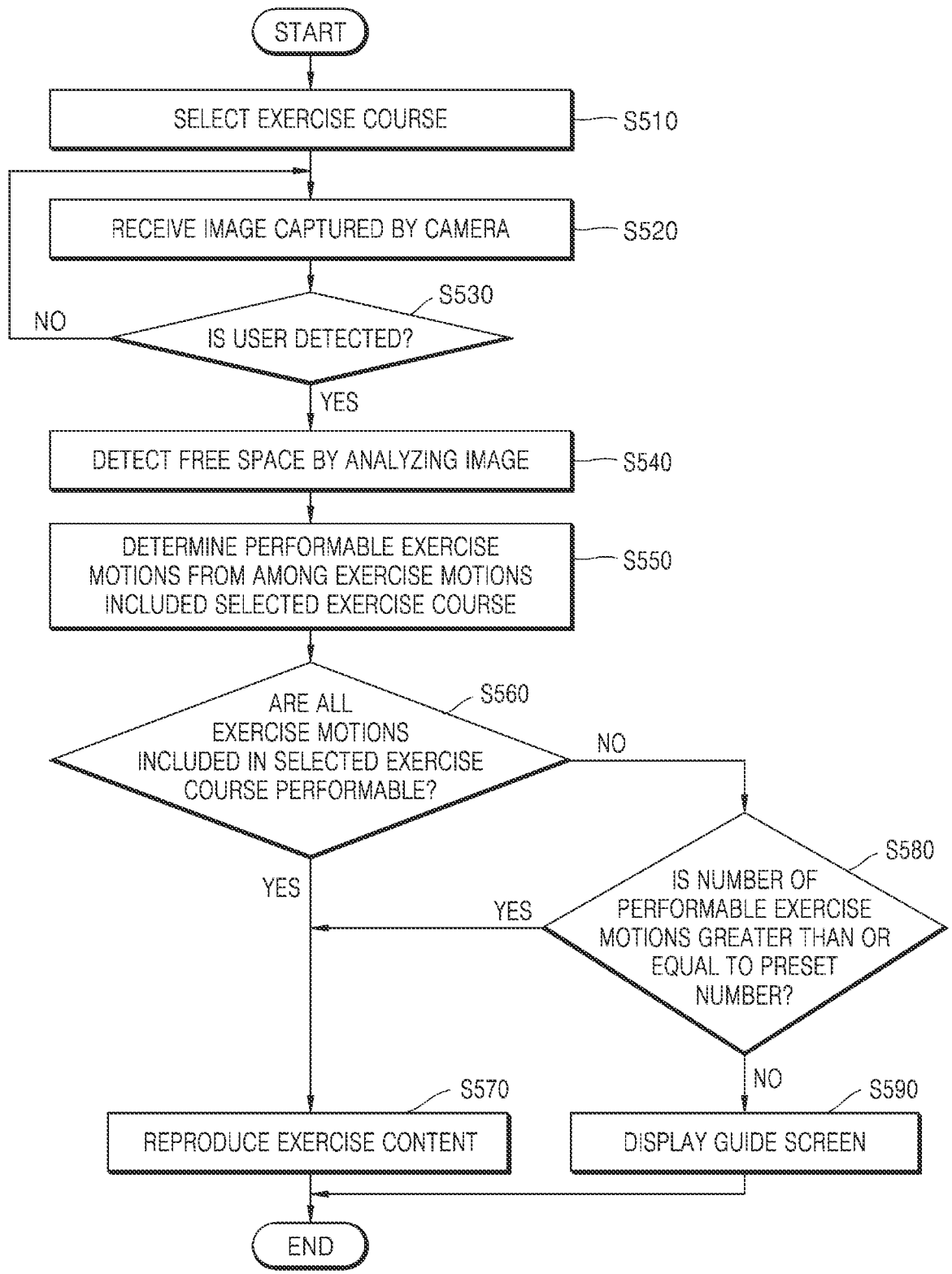
FIG. 5 is a flowchart illustrating an operating method of a display apparatus, according to an example embodiment.

FIG. 5 is a flowchart illustrating an operating method of a display apparatus, according to an embodiment.

Referring to FIG. 5, the display apparatus 100 may select an exercise course (S510).

According to an embodiment, the display apparatus 100 may provide a home training service, and the home training service may provide a plurality of exercise courses. The display apparatus 100 may select an exercise course by receiving a user input for selecting any one of the plurality of exercise courses.

Also, the display apparatus 100 may automatically select an exercise course suitable for the user based on an exercise history of a user and body type information about the user in addition to the user input. However, the disclosure is not limited thereto.

According to an embodiment, when the exercise course is selected, the display apparatus 100 may receive an image captured by a camera (S520).

The display apparatus 100 may detect a user in the captured image (S530). An operation of detecting a user in an image may be performed by using computer vision technology, artificial intelligence (AI) object recognition technology, machine learning technology, etc.

When the user is detected in the captured image, the display apparatus 100 may detect a free space surrounding the user by analyzing the image (S540).

The display apparatus 100 may detect a free space by using computer vision technology, AI object recognition technology, machine learning technology, etc. In detail, as described with reference to FIG. 3, the display apparatus 100 may detect the free space by using the saliency detection method, the DNN-based SSD method, the depth estimation method, etc.

The display apparatus 100 may determine exercise motions performable in the detected free space, from among exercise motions included in the selected exercise course (S550). In this case, when all of the exercise motions included in the selected exercise course are performable (see query at S560), the display apparatus 100 may reproduce exercise content corresponding to the selected exercise course (S570).

On the other hand, when only some of the exercise motions included in the selected exercise course are performable, the display apparatus 100 may determine whether the number of performable exercise motions is greater than or equal to a preset number (S580).

When the number of performable exercise motions is greater than or equal to the present number, the display apparatus 100 may reproduce exercise content that provides the performable exercise motions (e.g., see S570 in FIG. 5).

On the other hand, when the number of performable exercise motions is less than the preset number, the display apparatus 100 may display a guide screen for securing a screen (S590).

According to an embodiment, the guide screen may include information for guiding the user to secure additional space required for an exercise motion. For example, the guide screen may include an image in which a currently detected free space and an additionally required space are displayed in an image indicating an actual space whose image is captured by a camera. This will be described in detail with reference to FIG. 6.

Figure 6:
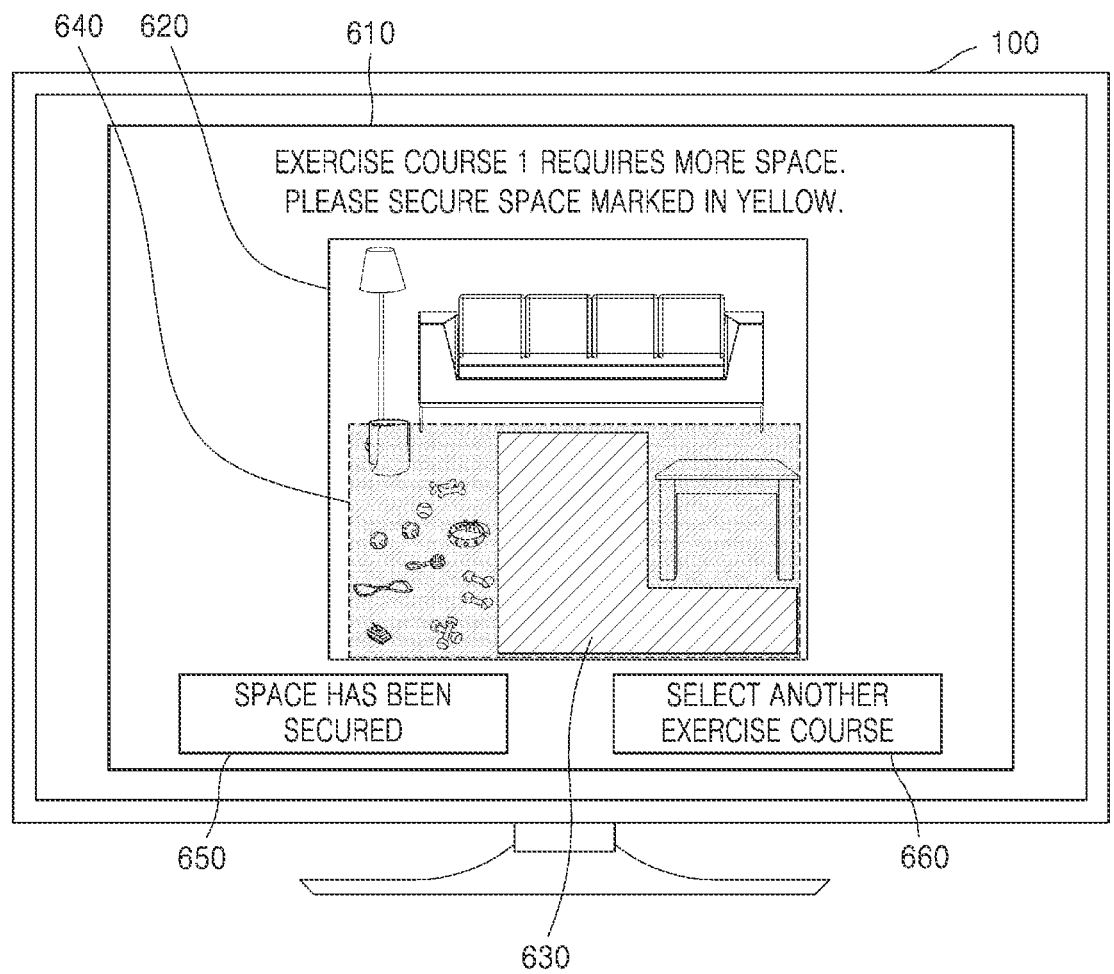
FIG. 6 is a diagram illustrating an example of a guide screen displayed on a display apparatus, according to an example embodiment.

FIG. 6 is a diagram illustrating an example of a guide screen displayed on a display apparatus, according to an embodiment.

Referring to FIG. 6, according to an embodiment, the display apparatus 100 may display a guide screen 610 including information about a space required to perform an exercise motion.

The display apparatus 100 may determine whether exercise motions included in a selected exercise course are performable in a detected free space, and when there is no performable exercise motion or the number of performable exercise motions is less than a preset number, may display the guide screen 610 as illustrated in FIG. 6.

According to an embodiment, the guide screen 610 may include a first image 620 actually captured by a camera, and a first area 630 indicating a detected free space and a second area 640 indicating a space required to perform an exercise motion may be displayed in the first image 620.

Also, according to an embodiment, the guide screen 610 may include a first object 650 for inputting that a space has been secured and a second object 660 for selecting another exercise course.

For example, a user may see the second area 640 displayed in the first image 620, secure additional free space, and then make an input for selecting the first object 650. When the input for selecting the first object 650 is received, the display apparatus 100 may reproduce exercise content corresponding to the selected exercise course.

Alternatively, when the input for selecting the first object 650 is received, the display apparatus 100 may obtain an image captured by the camera and detect the free space again. The display apparatus 100 may reproduce exercise content or display an additional guide screen based on the free space detected again.

Also, when an input for selecting the second object 660 is received, the display apparatus 100 may display a menu screen for selecting a new exercise course or may display information about an exercise course including performable exercise motions based on the detected free space.

Figure 7:
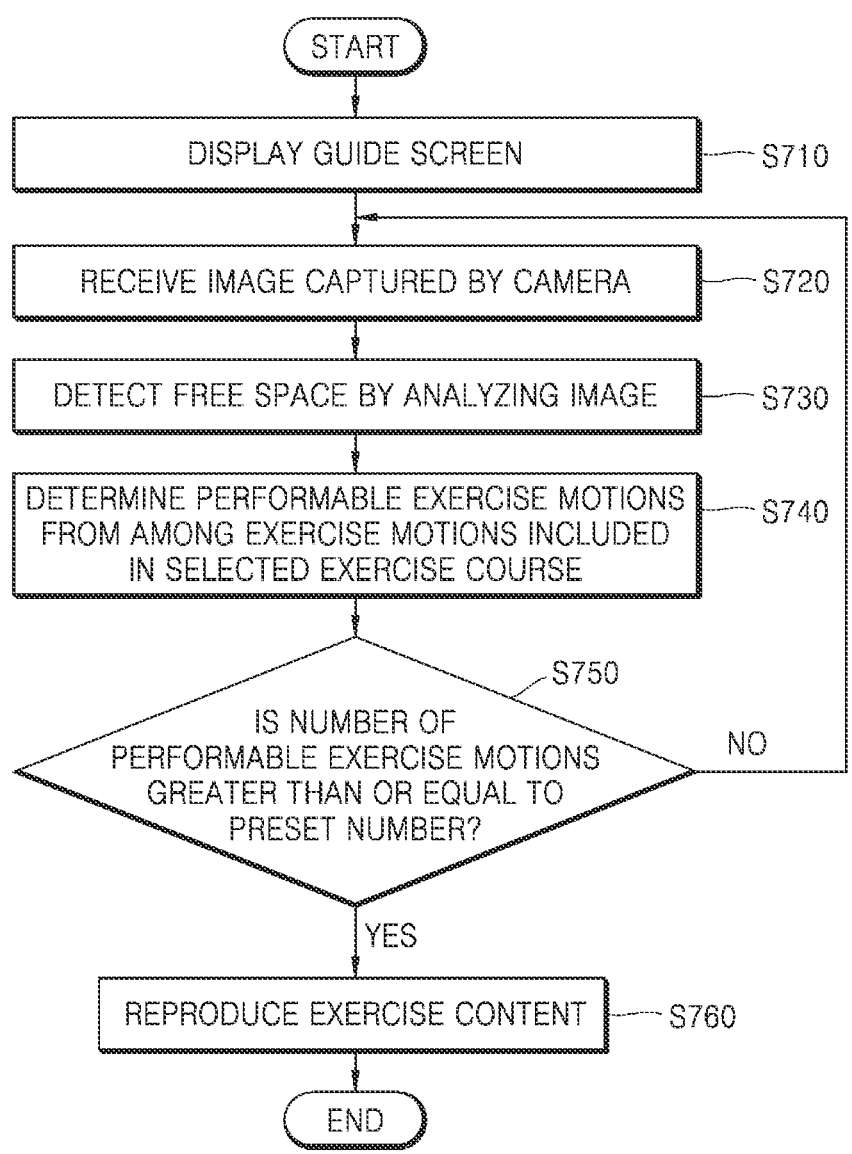
FIG. 7 is a flowchart illustrating an operating method of a display apparatus, according to an example embodiment.

FIG. 7 is a flowchart illustrating an operating method of a display apparatus, according to an embodiment.

Referring to FIG. 7, the display apparatus 100 may display a guide screen (S710). Operation 710 (S710) of FIG. 7 corresponds to operation 590 (S590) of FIG. 5.

For example, according to an embodiment, the display apparatus 100 may determine whether exercise motions included in a selected exercise course are performable in a detected free space, and when there is no performable exercise motion or the number of performable exercise motions is less than a preset number, may display the guide screen.

Figure 8:
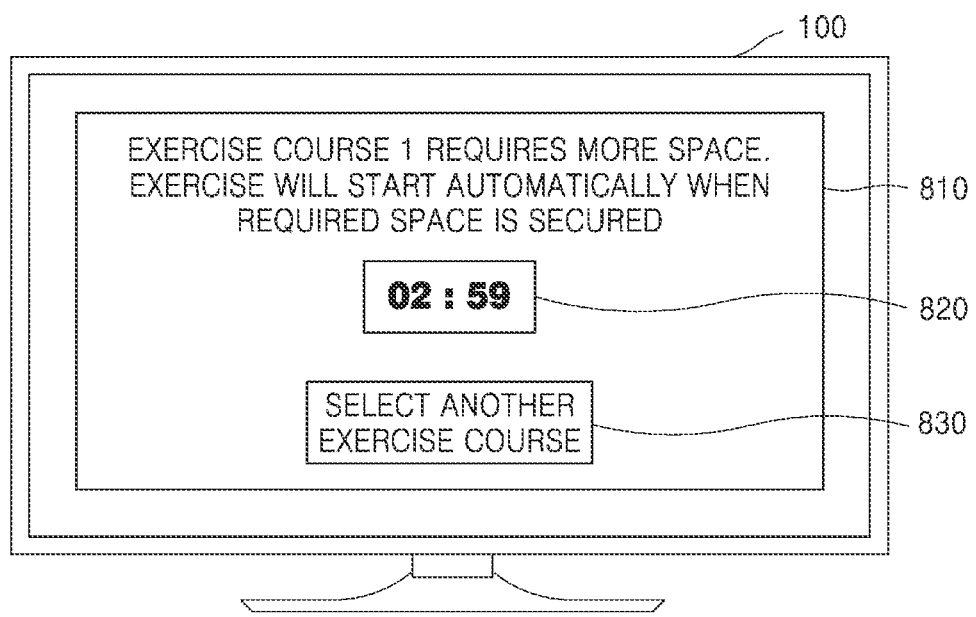
FIG. 8 is a diagram illustrating an example of a guide screen, according to an example embodiment.

FIG. 8 is a diagram illustrating an example of a guide screen, according to an embodiment.

Referring to FIG. 8, according to an embodiment, a guide screen 810 may include a message informing a user that more free space is required to perform exercise motions included in a currently selected exercise course.

Also, the guide screen 810 may include a time 820 until the display of the guide screen 810 ends. For example, when the time 820 displayed on the guide screen 810 reaches 00:00, the display of the guide screen 810 may end.

Also, the guide screen 810 may include an object 830 for selecting another exercise course.

Referring back to FIG. 7, according to an embodiment, when the guide screen is displayed, the display apparatus 100 may receive an image captured by a camera (S720).

The display apparatus 100 may detect a free space by analyzing the captured image (S730). Because this has been described in detail with reference to FIG. 3, a detailed description thereof is not provided.

The display apparatus 100 may determine exercise motions performable in the detected free space, from among exercise motions included in a selected exercise course (S740).

When the number of performable exercise motions is greater than or equal to a preset number (see query at S750 in FIG. 7), the display apparatus 100 may reproduce exercise content corresponding to the selected exercise course or reproduce exercise content that provides performable exercise motions (S760).

On the other hand, when the number of performable exercise motions is less than the preset number ("no" to query at S750 in FIG. 7), the display apparatus 100 may receive the image captured by the camera again (S720).

Until the number of exercise motions performable in the detected free space is greater than or equal to the preset number, the display of the guide screen 810 ends, or an input for selecting the object 830 included in the guide screen 810 is received, the display apparatus 100 may repeat operation 720 (S720), operation 730 (S730), operation 740 (S740), and operation 750 (S750) at a certain cycle.

Figure 9:
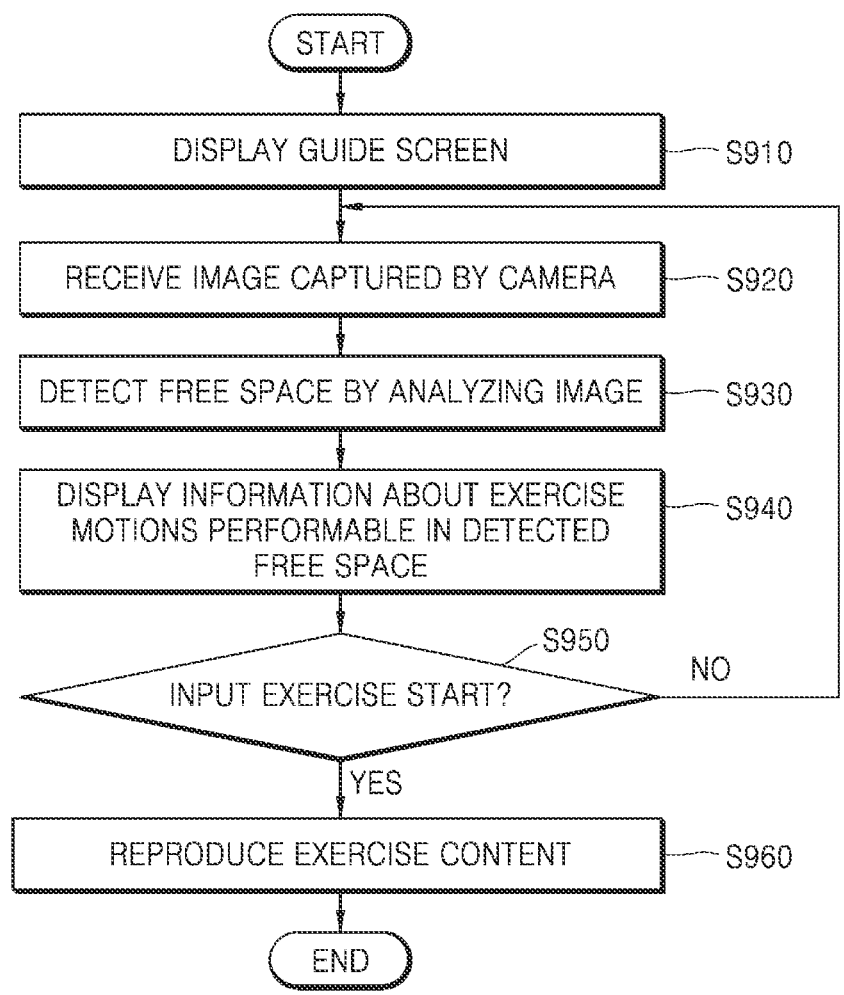
FIG. 9 is a flowchart illustrating an operating method of a display apparatus, according to an example embodiment.

FIG. 9 is a flowchart illustrating an operating method of a display apparatus, according to an embodiment.

Referring to FIG. 9, the display apparatus 100 may display a guide screen (S910). Operation 910 (S910) of FIG. 9 corresponds to operation 590 (S590) of FIG. 5.

For example, according to an embodiment, the display apparatus 100 may determine whether exercise motions included in a selected exercise course are performable in a detected free space, and when there is no performable exercise motion or the number of performable exercise motions is less than a preset number, may display the guide screen.

According to an embodiment, the guide screen includes information for guiding a user to secure an additionally required space, and may be the guide screen illustrated in FIG. 6 or 8. However, the disclosure is not limited thereto.

When the guide screen is displayed, the display apparatus 100 may receive an image captured by a camera (S920).

The display apparatus 100 may detect a free space by analyzing the captured image (S930). Because this has been described in detail with reference to FIG. 3, a detailed description thereof is not provided.

Also, the display apparatus 100 may determine exercise motions performable in the detected free space, from among exercise motions included in a selected exercise course, and may display information about the exercise motions determined to be performable (S940). This will be described in detail with reference to FIG. 10.

Figure 10:
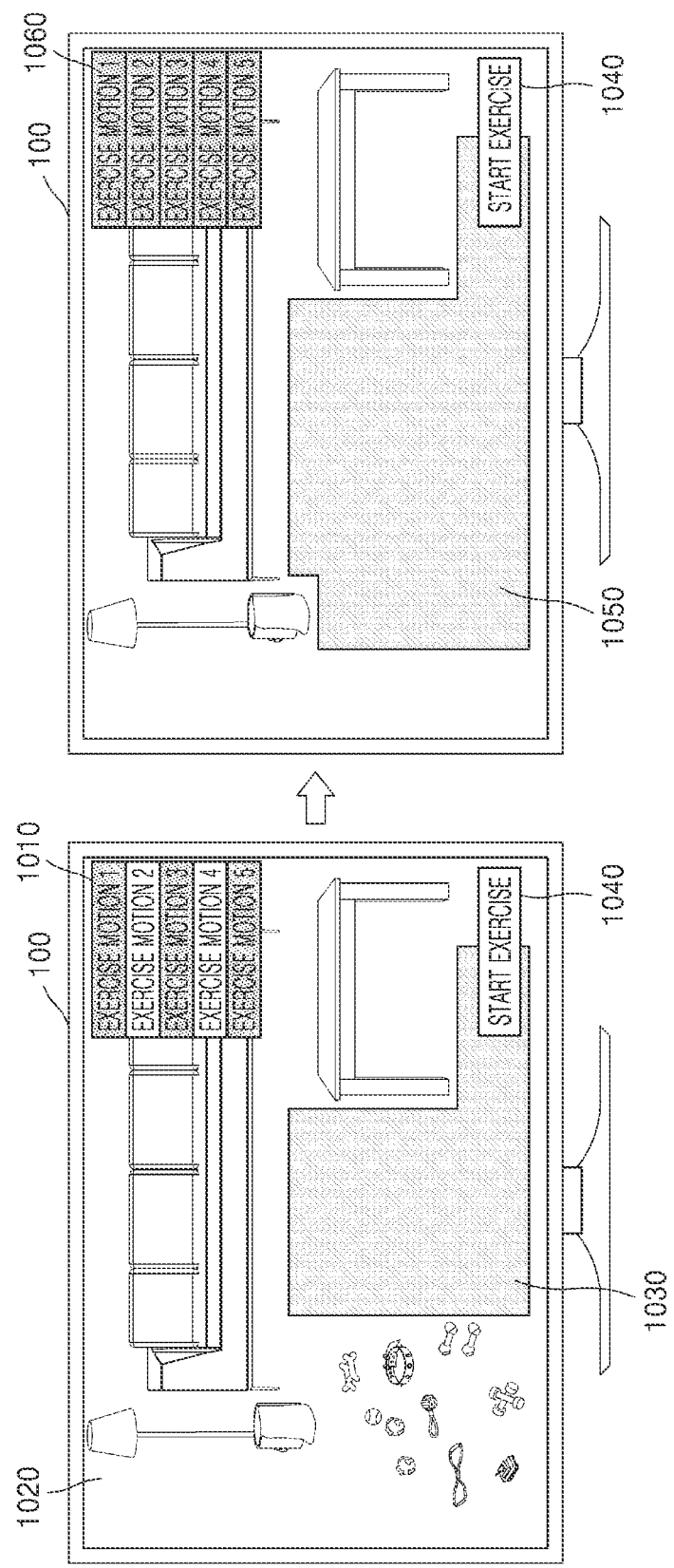
FIG. 10 is a diagram illustrating an example of a screen on which a display apparatus provides information about performable exercise motions, according to an example embodiment.

FIG. 10 is a diagram illustrating an example of a screen on which a display apparatus provides information about performable exercise motions, according to an embodiment.

Referring to FIG. 10, the display apparatus 100 may display a first list 1010 of exercise motions included in a selected exercise course. For example, the list 1010 may include items respectively indicating the exercise motions. In the first list 1010, the display apparatus 100 may display an item indicating a performable exercise motion with a first color and an item indicating an unperformable exercise motion with a second color.

Also, the display apparatus 100 may display a first image 1020 that is actually captured, and may display, in the first image 1020, a first area 1030 indicating a currently detected free space.

In addition, the display apparatus 100 may display a start exercise object 1040 for reproducing exercise content.

Referring back to FIG. 9, according to an embodiment, the display apparatus 100 may repeatedly perform operation 920 (S920), operation 930 (S930), operation 940 (S940), and operation 950 (S950) until an input for selecting the start exercise object 1040 is received. The inquiry at S950 is whether there has been an input for exercise start, and if so then there can be a reproduction of exercise content at S960.

For example, the display apparatus 100 may receive an image captured by a camera again, analyze the image to detect a free space, and determine exercise motions performable in the detected free space.

As illustrated in FIG. 10, when a free space corresponding to the first area 1030, a motion 1, a motion 3, and a motion 5 are performable and a motion 2 and a motion 4 are not performable. On the other hand, when a free space corresponding to a second area 1050 is detected, the motions 1 to 5 are all performable.

Accordingly, according to an embodiment, the display apparatus 100 may provide information about performable exercise motions by detecting additional free space secured by a user.

Referring back to FIG. 9, according to an embodiment, when the input for selecting the start exercise object 1040 is received, the display apparatus 100 may reproduce exercise content that provides currently performable exercise motions (e.g., se S960 in FIG. 9).

For example, as illustrated in FIG. 10, when an input for selecting the start exercise object 1040 is received in a state in which the first list 1010 is displayed, the display apparatus 100 may reproduce exercise content that provides the motion 1, the motion 3, and the motion 5.

Alternatively, when an input for selecting the start exercise object 1040 is received in a state in which a second list 1060 is displayed, the display apparatus 100 may reproduce exercise content that provides the motions 1 to 5.

Figure 11:
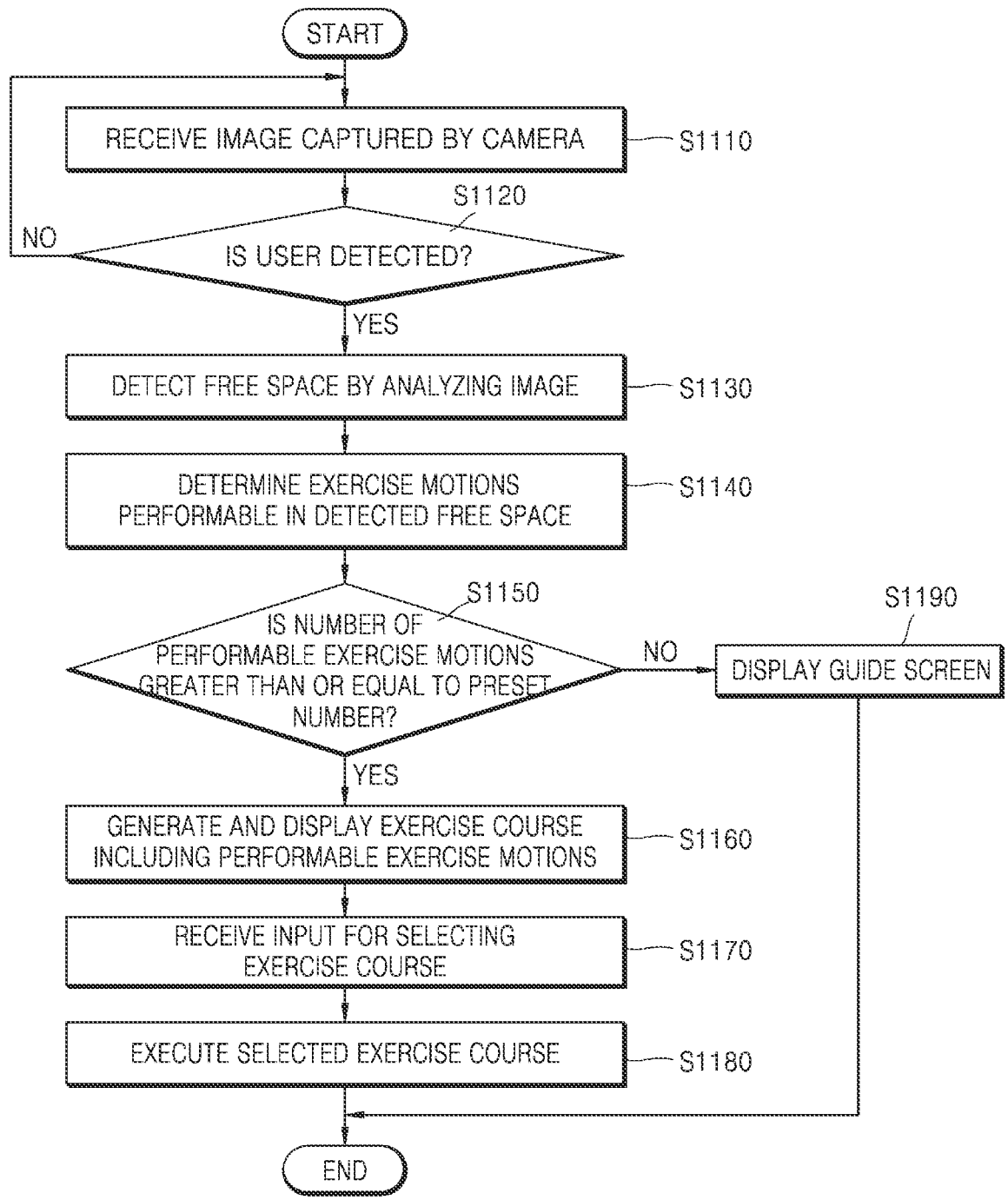
FIG. 11 is a flowchart illustrating an operating method of a display apparatus, according to an example embodiment.

FIG. 11 is a flowchart illustrating an operating method of a display apparatus, according to an embodiment.

Referring to FIG. 11, according to an embodiment, the display apparatus 100 may receive an image captured by a camera (S1110).

Also, the display apparatus 100 may detect a user in the image captured by the camera (S1120), and when the user is detected, may detect a free space included in the image by analyzing the image (S1130).

According to an embodiment, the display apparatus 100 may determine, based on the detected free space, one or more exercise motions performable in the detected free space (S1140).

The display apparatus 100 may determine whether the number of performable exercise motions is greater than or equal to a preset number (S1150).

When the number of performable exercise motions is greater than or equal to the preset number, the display apparatus 100 may determine an exercise course including only performable exercise motions and display information about the determined exercise course (S1160).

The information about the exercise course may include a name of the exercise course, exercise content corresponding to the exercise course, information about exercise motions included in the exercise course, information about a time required to perform the exercise course, etc., but is not limited thereto.

Also, the display apparatus 100 may provide exercise course recommendation information based on body type information or an exercise history of the user detected in operation 1120 (S1120).

When an input for selecting the exercise course is received (S1170), the display apparatus 100 may reproduce exercise content corresponding to the selected exercise course (S1180).

On the other hand, when there is no exercise motion performable in the detected free space or the number of performable exercise motions is less than a preset number, the display apparatus 100 may display a guide screen including information about a space required to perform the exercise motion (S1190).

Figure 12:
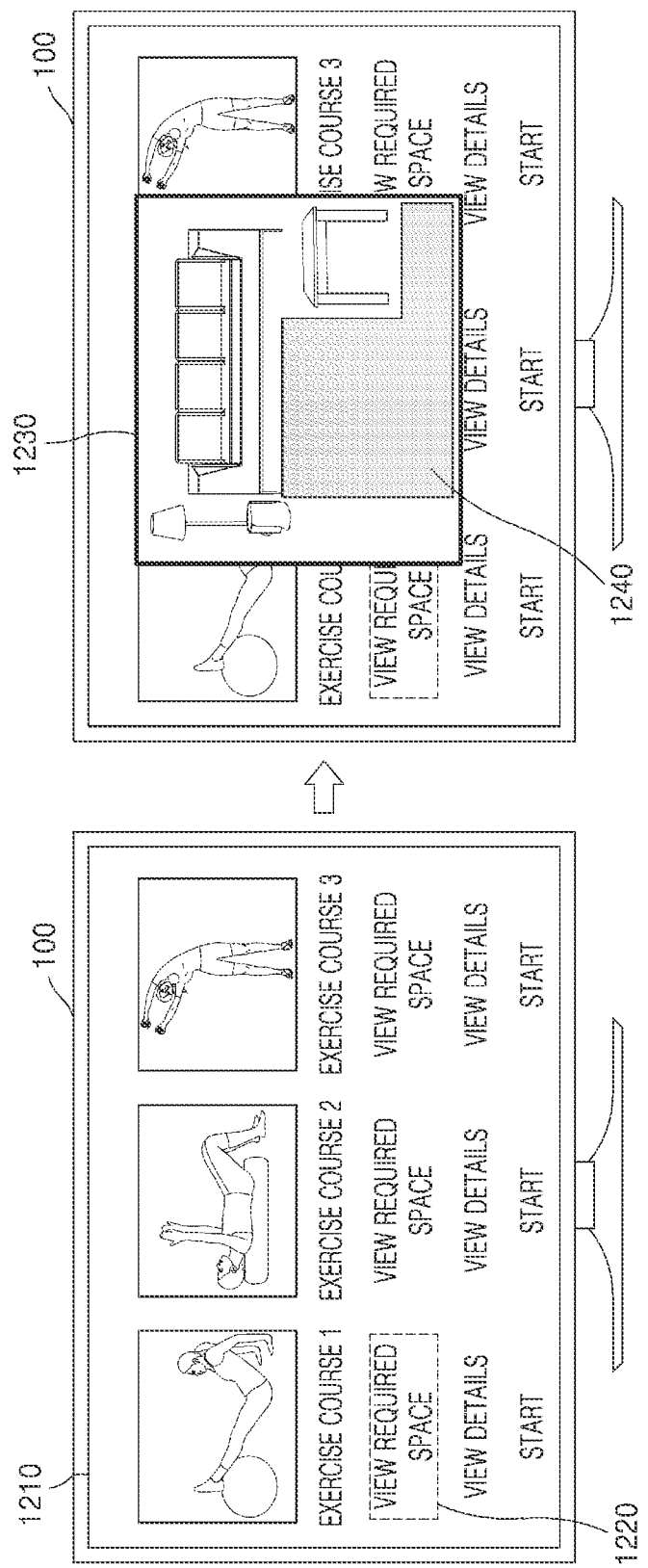
FIG. 12 is a diagram illustrating an example of an exercise course selection screen, according to an example embodiment.

FIG. 12 is a diagram illustrating an example of an exercise course selection screen, according to an embodiment.

Referring to FIG. 12, according to an embodiment, the display apparatus 100 may display an exercise course selection screen 1210 for selecting an exercise course.

The exercise course selection screen 1210 may include information about a plurality of exercise courses that provide a home training service. For example, information about an exercise course may include a name of the exercise course, a representative image representing the exercise course (e.g., a thumbnail image of an exercise course video, etc.), information about a space required for the exercise course, information about exercise motions included in the exercise course, information about a time required to perform the exercise course, and information about effects of the exercise course, but is not limited thereto.

According to an embodiment, the display apparatus 100 may provide information about a space required to perform exercise motions included in the exercise course.

For example, the exercise course selection screen 1210 may include a view required space object 1220 corresponding to each of the plurality of exercise courses.

When an input for selecting the view required space object 1220 included in the exercise course selection screen 1210 is received, the display apparatus 100 may display information about a space required to perform exercise motions included in a corresponding exercise course.

For example, as illustrated in FIG. 12, when a view required space object corresponding to an exercise course 1 is selected, the display apparatus 100 may display an image indicating a space required to perform exercise motions included in the exercise course 1 in a pop-up window 1230. In this case, the image displayed on the pop-up window 1230 may be an actual image captured by a camera, and an area 1240 corresponding to the space required to perform the exercise motions included in the exercise course 1 may be displayed in the image. However, the disclosure is not limited thereto.

FIG. 13 is a diagram for describing an operation of a display apparatus, according to an embodiment.

Referring to FIG. 13, according to an embodiment, the display apparatus 100 may receive an image captured by the camera 110. The display apparatus 100 may obtain an image, captured by the camera 110, of a space within a preset range and, as illustrated in FIG. 13, may obtain an image of a space 1310 located in front of the display apparatus 100.

The display apparatus 100 may detect an exercise tool or an exercise equipment in the captured image. For example, the display apparatus 100 may detect the exercise tool or the exercise equipment by using computer vision technology, AI object recognition technology, machine learning technology, etc. The display apparatus 100 may detect an exercise tool, such as a Pilates ring, a gym ball, a foam roller, etc., in the captured image.

The display apparatus 100 may determine an exercise course based on the detected exercise tool. For example, the display apparatus 100 may determine an exercise course including an exercise motion using the detected exercise tool or exercise equipment from among a plurality of exercise courses provided by a home training service, and may display information about the determined exercise course. The information about the exercise course may include a name of the exercise course, exercise content corresponding to the exercise course, information about exercise motions included in the exercise course, information about a time required to perform the exercise course, etc., but is not limited thereto.

For example, among the plurality of exercise courses, the display apparatus 100 may display exercise content 1350 corresponding to an exercise course 1 including a motion using a gym ball 1330 and exercise content 1360 corresponding to an exercise course 2 including an exercise motion using a foam roller 1340.

When an input for selecting any one of pieces of exercise content displayed on a display (e.g., an input for selecting a 'start' object) is received, the display apparatus 100 may reproduce selected exercise content.

Accordingly, according to an embodiment, the display apparatus 100 may identify an exercise tool and/or an exercise equipment (e.g., see 1320, 1330, and/or 1340 in FIG. 13) present in a space surrounding a user and provide the user with an exercise course including exercise motions performable by using the identified exercise tool or exercise equipment.

Figure 14:
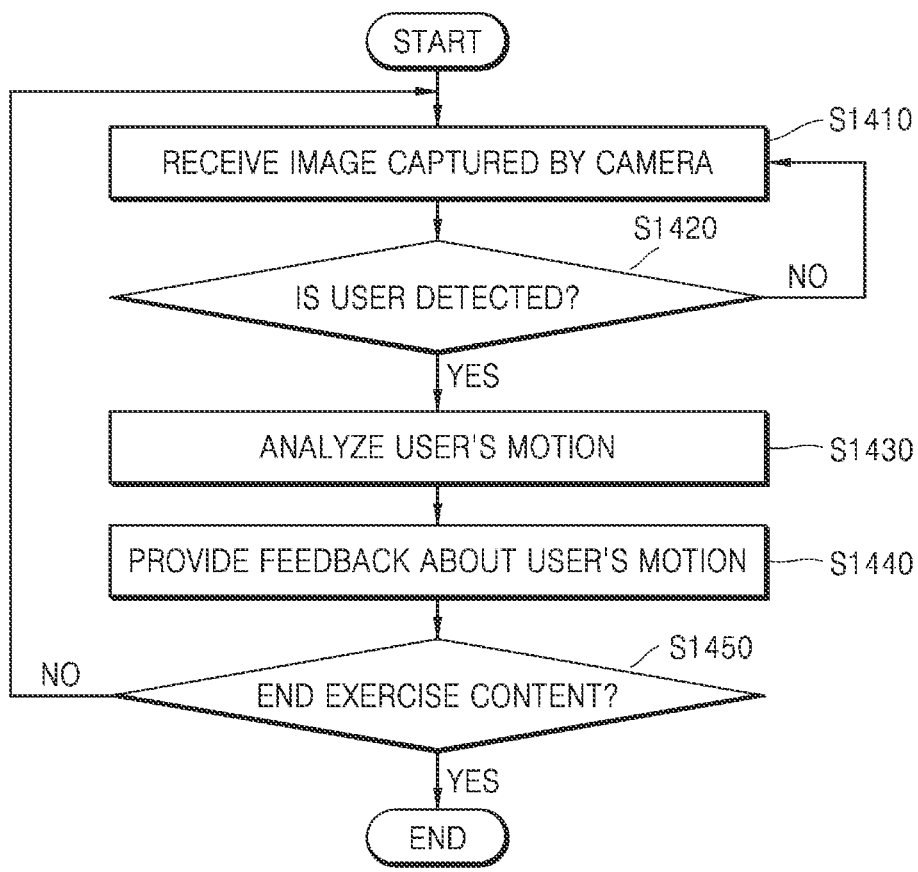
FIG. 14 is a flowchart illustrating a method of providing a home training service, when a display apparatus reproduces exercise content, according to an example embodiment.

FIG. 14 is a flowchart illustrating a method of providing a home training service, when a display apparatus reproduces exercise content, according to an embodiment, and FIG. 15 is a diagram referred to in the description of FIG. 14.

According to an embodiment, the display apparatus 100 may reproduce exercise content. In this case, the exercise content may be video content representing exercise motions. For example, as illustrated in FIG. 15, the exercise content may include content that a trainer performs exercise motions, and the display apparatus 100 may reproduce corresponding video content by displaying or outputting images representing exercise motions in real time.

While the video content is reproduced, a user 1510 may watch the video content output on a display and follow exercise motions. Although FIG. 15 illustrates that the trainer who performs the exercise motions is an actual person, the disclosure is not limited thereto and the trainer may be a virtual person such as a character or an avatar.

Referring to FIG. 14, according to an embodiment, the display apparatus 100 may receive an image captured by the camera 110 while exercise content is reproduced (S1410). In this case, the display apparatus 100 may obtain an image of the user 1510 who follows an exercise motion while watching the exercise content.

The display apparatus 100 may detect a user in the obtained image (S1420) and analyze a posture or a motion of the detected user (S1430).

The display apparatus 100 may provide feedback to the user based on a result of the analyzing of the posture or the motion of the user (S1440). "Based on" as used herein covers based at least on.

The display apparatus 100 may output coaching information for coaching the posture or the motion of the user. For example, the display apparatus 100 may display the coaching information on the display so that the user may visually recognize the coaching information, or may output the coaching information through a speaker so that the user may audibly recognize the coaching information.

The display apparatus 100 may output information indicating the accuracy of a posture or a motion of a user who follows an exercise motion. For example, the display apparatus 100 may display, on the display, the accuracy of the posture of the user or a message such as bad, good, excellent, etc.

Alternatively, the display apparatus 100 may output information about a part to be corrected in the posture of the user who follows the exercise motion. For example, as illustrated in FIG. 15, the display apparatus 100 may display a message 1520, such as 'Please spread your arms more', on the display or output the message 1520 through the speaker. However, the disclosure is not limited thereto.

The display apparatus 100 may provide the home training service to the user while repeating operation 1410 (S1410), operation 1420 (S1420), operation 1430 (S1430), operation 1440 (S1440), and operation 1450 (S1450) until the reproduction of the exercise content ends.

Figure 16:
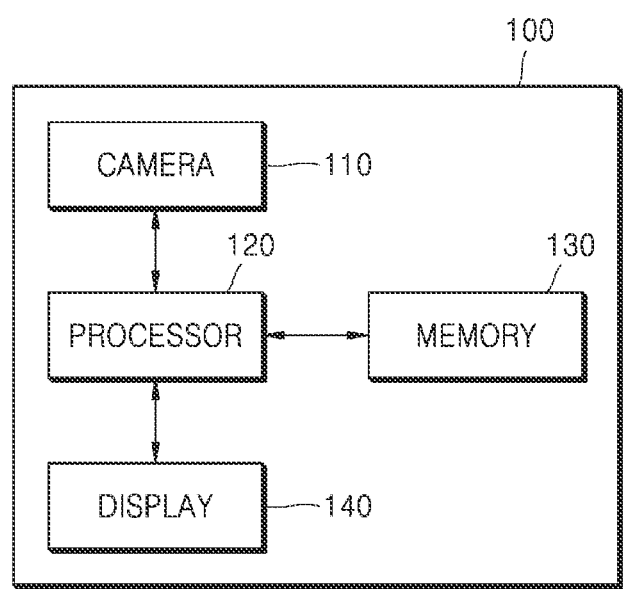
FIG. 16 is a block diagram illustrating a configuration of a display apparatus, according to an example embodiment.

FIG. 16 is a block diagram illustrating a configuration of a display apparatus, according to an embodiment.

Referring to FIG. 16, according to an embodiment, the display apparatus 100 may include the camera 110, a processor 120, a memory 130, and a display 140.

According to an embodiment, the camera 110 may obtain an image frame, such as a still image or a moving image, through an image sensor. For example, the camera 110 may obtain an image of a space included in a camera recognition range and may obtain an image of a user present within the camera recognition range. The image captured by using the camera 110 may be processed through the processor 120 or a separate image processor (not illustrated), and the processor 120 may detect a user or a free space included in the image by analyzing the image. Two or more cameras 110 may be included according to a structural aspect of the display apparatus 100.

According to an embodiment, the processor 120 controls overall operations of the display apparatus 100 and a signal flow between internal components of the display apparatus 100, and processes data.

The processor 120 (including processing circuitry) may include a single core or a multi-core such as a dual-core, a triple-core, a quad-core, etc. The processor 120 may include a plurality of processors. For example, the processor 120 may be implemented as a main processor (not shown) and a sub-processor (not shown) that operates in a sleep mode.

The processor 120 may include at least one of a central processing unit (CPU), a graphics processing unit (GPU), or a video processing unit (VPU). Alternatively, according to an embodiment, the processor 120 may be implemented in the form of a system on chip (SoC) in which at least one of a CPU, a GPU, or a VPU is integrated.

According to an embodiment, the memory 130 may store various types of data, programs, or applications for driving and controlling the display apparatus 100.

Also, a program stored in the memory 130 may include one or more instructions. A program (one or more instructions) or the application stored in the memory 130 may be executed by the processor 120.

According to an embodiment, when the module for performing a function of detecting a free space in FIG. 3 is configured as a program, the memory 130 may store the free space detection module illustrated in FIG. 3.

According to an embodiment, the processor 120 may obtain an image of a space within a preset range by using a camera. Also, the processor 120 may obtain an image captured by the camera based on a home training application execution input or a user input for selecting an exercise course. The processor 120 may detect a user in the image captured by the camera, and when the user is detected, may obtain an image, which is captured, of a space surrounding the user.

The processor 120 may detect a free space included in the image by analyzing the obtained image. The processor 120 may detect the free space included in the image by using the saliency detection method. Alternatively, the processor 120 may detect objects included in the image by using the DNN-based SSD method, the depth estimation method, etc. and may detect a free space included in the image based on the detected objects. Alternatively, the processor 120 may segment the image and detect the free space based on segmented areas. However, the disclosure is not limited thereto, and the processor 120 may detect the free space included in the image by using various well-known methods.

The processor 120 may determine, based on the detected free space, one or more exercise motions performable in the detected free space. The processor 120 may determine exercise motions performable in the detected free space, from among exercise motions included in the selected exercise course. For example, when the lower body strengthening course is selected, the processor 120 may determine whether each of squat, lunge, and plank motions included in a lower body strengthening course is performable, based on a location and a size of the detected free space.

The processor 120 may provide exercise content based on the exercise motions determined to be performable. For example, when only squat and lunge motions are performable in the detected free space among the exercise motions included in the lower body strengthening course, and there is not enough space to perform the plank motion, the processor 120 may reproduce or output exercise content including images for guiding the squat and lunge motions.

Alternatively, when no exercise course is selected, the processor 120 may select an exercise course including only exercise motions performable in the detected free space, from among the plurality of exercise courses, and may reproduce or output exercise content corresponding to the selected exercise course.

When the number of performable exercise motions among the exercise motions included in the selected exercise course is less than a preset number, the processor 120 may control the display 140 to display a guide screen for securing a space.

According to an embodiment, the guide screen may include information for guiding the user to secure additional space required for an exercise motion. For example, the guide screen may include an image in which a currently detected free space and an additionally required space are displayed in an image indicating an actual space whose image is captured by the camera.

According to an embodiment, the processor 120 may control the display 140 to output information about the performable exercise motions. The processor 120 may control the display 140 to display information about an exercise course including the performable exercise motions.

Moreover, the processor 120 may obtain an image of a user captured by the camera 110 while exercise content is reproduced. The processor 120 may detect a user in the obtained image and analyze a posture or a motion of the detected user. Also, the processor 120 may provide feedback to the user based on a result of the analyzing of the posture or the motion of the user.

According to an embodiment, the display 140 generates a driving signal by converting an image signal, a data signal, an on-screen display (OSD) signal, a control signal, etc. processed by the processor 120. The display 140 may be embodied as a plasma display panel (PDP), a liquid crystal panel (LCD), an organic light-emitting diode (OLED), a flexible display, etc. or may be embodied as a three-dimensional (3D) display. Also, the display 140 may be configured as a touch screen to be used as not only an output device but also an input device.

According to an embodiment, the display 140 may display an exercise content image or a guide screen for securing a space required for exercise. Alternatively, the display 140 may display feedback information about a posture or a motion of a user who follows an exercise motion.

Figure 17:
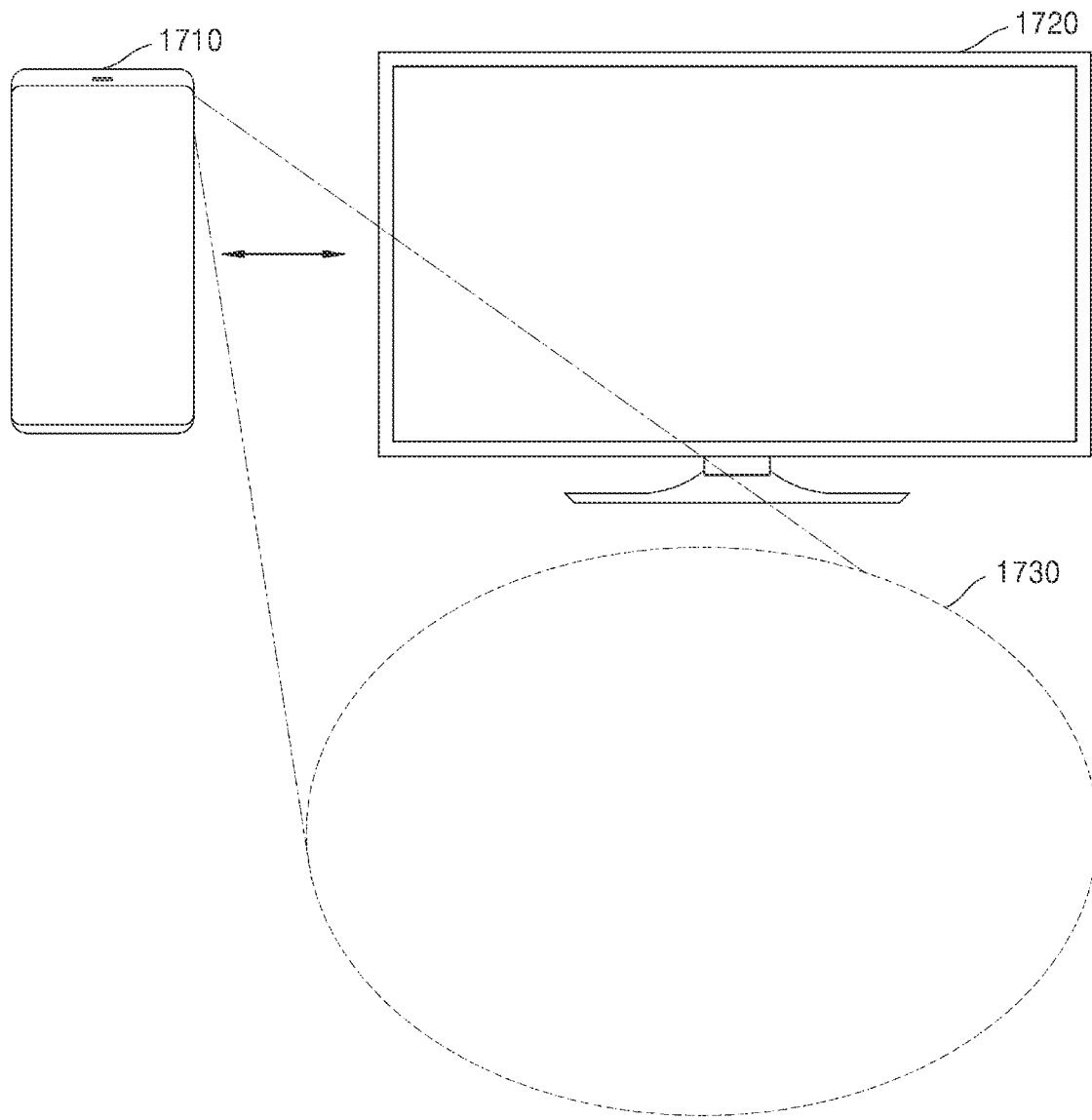
FIG. 17 is a diagram illustrating a home training service providing system, according to an example embodiment.

FIG. 17 is a diagram illustrating a home training service providing system, according to an embodiment.

Referring to FIG. 17, according to an embodiment, the home training service providing system may include a camera apparatus 1710 and a display apparatus 1720. The camera apparatus 1710 and the display apparatus 1720 may be connected through wired/wireless communication.

According to an embodiment, the camera apparatus 1710 may include an electronic apparatus including a camera. For example, the camera apparatus 1710 may be implemented as various types of electronic apparatuses, such as a digital camera, a camcorder, a mobile phone, a tablet PC, etc.

Also, the display apparatus 1720 may include an electronic apparatus including a display.

According to an embodiment, the camera apparatus 1710 may be mounted in the display apparatus 1720 as a separate apparatus from the display apparatus 1720.

According to an embodiment, the camera apparatus 1710 may obtain an image frame, such as a still image or a moving image, through an image sensor. For example, the camera apparatus 1710 may obtain an image of a space 1730 included in a camera recognition range. The camera apparatus 1710 may transmit the obtained image to the display apparatus 1720 through wired/wireless communication. The display apparatus 1720 may detect a user or a free space by analyzing the image received from the camera apparatus 1710.

Alternatively, according to an embodiment, the camera apparatus 1710 may include a processor and a memory. The camera apparatus 1710 may perform some of operations performed by the processor 120 of the display apparatus 100 of FIG. 16. For example, the camera apparatus 1710 may detect a free space or a user by analyzing the image obtained by the camera apparatus 1710. The camera apparatus 1710 may transmit a result of the detecting to the display apparatus 1720 through wired/wireless communication.

Accordingly, the display apparatus 1720 may determine one or more exercise motions performable in the detected free space, based on the free space detected through image analysis in the display apparatus 1720 or the result of the detecting of the free space received from the camera apparatus 1710. Because an operation of determining one or more exercise motions performable in the detected free space has been described in detail with reference to FIGS. 1 to 16, a detailed description thereof is not provided.

Alternatively, according to an embodiment, the camera apparatus 1710 may determine one or more exercise motions performable in the detected free space, based on the free space detected through image analysis in the camera apparatus 1710. The camera apparatus 1710 may transmit information about an exercise motion determined to be performable to the display apparatus 1720 through wired/wireless communication. The display apparatus 1720 may reproduce or output exercise content or display a guide screen for securing a space, based on the information about the determined exercise motion received from the camera apparatus 1710. Because an operation of reproducing or outputting the exercise content or displaying the guide screen for securing a space based on the information about the determined exercise motion has been described in detail with reference to FIGS. 1 to 16, a detailed description thereof is not provided.

Figure 18:
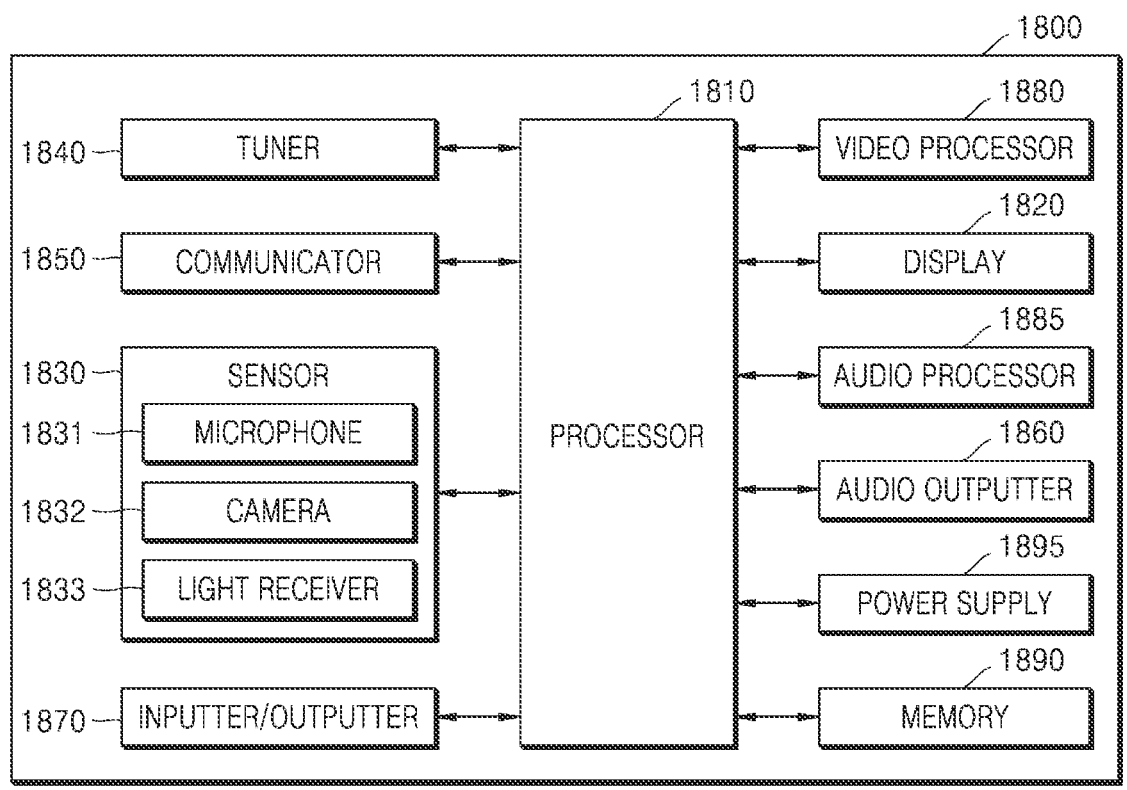
FIG. 18 is a block diagram illustrating a configuration of a display apparatus, according to another example embodiment.

FIG. 18 is a block diagram illustrating a configuration of a display apparatus, according to another embodiment.

Referring to FIG. 18, a display apparatus 1800 of FIG. 18 may be an example of the display apparatus 100 described above with reference to FIGS. 1 to 16.

Referring to FIG. 18, according to an embodiment, the display apparatus 1800 may include a tuner 1840, a processor 1810, a display 1820, a communicator 1850, a sensor 1830, an inputter/outputter 1870, a video processor 1880, an audio processor 1885, an audio outputter 1860 comprising output circuitry, a memory 1890, and a power supply 1895. Each processor herein comprises processing circuitry.

A camera 1832 of FIG. 18 corresponds to the camera 110 of FIG. 16, the processor 1810 of FIG. 18 corresponds to the processor 120 of FIG. 16, the memory 1890 of FIG. 18 corresponds to the memory 130 of FIG. 16, and the display 1820 of FIG. 18 corresponds to the display 140 of FIG. 16. Therefore, repeated descriptions thereof are not provided again.

According to an embodiment, the tuner 1840 may tune and select a frequency of a channel that the display apparatus 1800 is to receive, from among a large number of radio wave components, by performing amplification, mixing, resonance, etc. on a broadcasting signal received in a wired or wireless manner. The broadcast signal includes audio, video, and additional information (e.g., an electronic program guide (EPG)).

The tuner 1840 may receive broadcast signals from various sources such as terrestrial broadcasting, cable broadcasting, satellite broadcasting, Internet broadcasting, etc. The tuner 1840 may receive broadcast signals from a source such as analog broadcasting or digital broadcasting.

The communicator 1850 may transmit or receive data or signals to or from an external apparatus or a server. For example, the communicator 1850 may include a Wi-Fi module, a Bluetooth module, an infrared (IR) communication module, a wireless communication module, a local area network (LAN) module, an Ethernet module, a wired communication module, etc. In this case, each communication module may be implemented as at least one hardware chip.

The Wi-Fi module and the Bluetooth module perform communication by using a Wi-Fi method and a Bluetooth method, respectively. When the Wi-Fi module or the Bluetooth module is used, various types of connection information such as a service set identifier (SSID) and a session key may be transmitted and received first, a communication connection may be established by using the connection information, and then various types of information may be transmitted and received. The wireless communication module may include at least one communication chip for performing communication according to various wireless communication standards such as Zigbee, $3^{rd}$ generation (3G), $3^{rd}$ generation partnership project (3GPP), long term evolution (LTE), LTE advanced (LTE-A), $4^{th}$ generation (4G), and $5^{th}$ generation (5G).

The sensor 1830 may detect a voice, an image, or an interaction of a user, and may include a microphone 1831, the camera 1832, and a light receiver 1833.

The microphone 1831 receives a voice uttered by the user. The microphone 1831 may convert the received voice into an electrical signal and output the electrical signal to the processor 1810. The voice of the user may include, for example, a voice corresponding to a menu or a function of the display apparatus 1800.

The camera 1832 may receive an image (e.g., consecutive image frames) corresponding to a user's motion including a gesture in a camera recognition range. The processor 1810 may select a menu displayed on the display apparatus 1800 by using a received motion recognition result, or perform a control operation corresponding to a motion recognition result.

The light receiver 1833 receives an optical signal (including a control signal) from an external control apparatus through an optical window (not illustrated) of a bezel of the display 1820. The light receiver 1833 may receive, from a control apparatus, an optical signal corresponding to a user input (e.g., a touch, a press, a touch gesture, a voice, or a motion). A control signal may be extracted from the received optical signal under the control by the processor 1810.

The processor 1810 controls overall operations of the display apparatus 1800 and a signal flow between internal components of the display apparatus 1800, and processes data. The processor 1810 may execute an operating system (OS) and various applications stored in the memory 1890 when there is a user input or a preset and stored condition is satisfied.

The processor 1810 may include random access memory (RAM) storing signals or data input from outside the display apparatus 1800, or used as a storage area corresponding to various operations performed in the display apparatus 1800, read-only memory (ROM) storing a control program for controlling the display apparatus 1800, and a processor.

The video processor 1880 processes video data received by the display apparatus 1800. The video processor 1880 may perform various image processing operations, such as decoding, scaling, noise reduction, frame rate conversion, and resolution conversion, on the video data.

The audio processor 1885 processes audio data. The audio processor 1885 may perform various processing operations, such as decoding, amplification, and noise reduction, on the audio data. Moreover, the audio processor 1885 may include a plurality of audio processing modules to process audio data corresponding to a plurality of pieces of content.

The audio outputter 1860 outputs audio data included in a broadcast signal received through the tuner 1840, under the control by the processor 1810. The audio outputter 1860 may output audio data (e.g., a voice or a sound) input through the communicator 1850 or the inputter/outputter 1870. Also, the audio outputter 1860 may output audio data stored in the memory 1890, under the control by the processor 1810. The audio outputter 1860 may include at least one of a speaker, a headphone output port, or a Sony/Philips digital interface (S/PDIF) output port.

The inputter/outputter 1870 may receive a video (e.g., a moving image, etc.), audio (e.g., a voice, music, etc.), and additional information (e.g., electronic program guide (EPG), etc.) from outside of the display apparatus 1800. The inputter/outputter 1870 may include one of a high-definition multimedia interface (HDSI), a mobile high-definition link (MHL), a universal serial bus (USB), a display port (DP), a thunderbolt port, a video graphics array (VGA) port, a red-green-blue (RGB) port, a D-subminiature (D-SUB), a digital visual interface (DVI) port, a component jack, and a PC port.

The power supply 1895 supplies power from an external power source to the internal components of the display apparatus 1800 under the control by the processor 1810. The power supply 1895 may supply power output from one or more batteries (not illustrated) provided in the display apparatus 1800, to the internal components under the control by the processor 1810.

The memory 1890 may store various types of data, programs, or applications for driving and controlling the display apparatus 1800, under the control by the processor 1810. Although not illustrated, the memory 1890 may include a broadcast reception module, a channel control module, a volume control module, a communication control module, a voice recognition module, a motion recognition module, a light reception module, a display control module, an audio control module, an external input control module, a power control module, a power control module of an external apparatus connected in a wireless manner (e.g., Bluetooth), a voice database (DB), or a motion DB. The modules and DBs of the memory 1890, which are not illustrated, may be implemented in the form of software in the display apparatus 1800 to perform a broadcast reception control function, a channel control function, a volume control function, a communication control function, a voice recognition function, a motion recognition function, a light reception control function, a display control function, an audio control function, an external input control function, a power control function, or a power control function of an external apparatus connected in a wireless manner (e.g., Bluetooth). The processor 1810 may perform respective functions by using the corresponding software stored in the memory 1890.

Moreover, the block diagrams of the display apparatuses 100 and 1800 illustrated in FIGS. 16 and 18 are block diagrams for an embodiment. Components included in the block diagrams may be integrated, added, or omitted depending on specifications of the implemented display apparatuses 100 and 1800. That is, two or more components may be combined into one component, or one component may be subdivided into two or more components as needed. In addition, functions performed by each block are for explaining the embodiments, and specific operations or apparatuses thereof do not limit the scope.

An operating method of a display apparatus, according to an embodiment, may be implemented in the form of program commands executable by various computer means and be recorded on a computer-readable recording medium. The computer-readable recording medium may include program commands, data files, data structures, and the like separately or in combinations. The program commands written to the computer-readable recording medium may be specifically designed and configured for the disclosure or may be well-known and available to those of ordinary skill in the art of computer software. Examples of the computer-readable recording medium include magnetic media (e.g., hard disks, floppy disks, magnetic tapes, etc.), optical media (e.g., CD-ROMs, or DVDs), magneto-optical media (e.g., floptical disks), and hardware apparatuses (e.g., ROM, RAM, flash memories, etc.) specifically configured to store and execute program commands. Examples of the program commands include high-level language codes that may be executed by a computer by using an interpreter or the like as well as machine codes that are generated by a compiler.

The operating method of the display apparatus, according to the embodiments, may be included and provided in a computer program product. The computer program product may be traded between a seller and a buyer as a commodity.

The computer program product may include an S/W program or a computer-readable storage medium storing the S/W program. For example, the computer program product may include an S/W program form of product (e.g., a downloadable application) electronically distributed through a manufacturer of the electronic apparatus or an electronic market (e.g., Google PlayStore, or App Store). For electronic distribution, at least a part of the S/W program may be stored in a storage medium or may be temporarily generated. In this case, the storage medium may be a storage medium of a server of the manufacturer, a server of the electronic market, or a relay server that temporarily stores the S/W program.

The computer program product may include a storage medium of a server or a storage medium of a client apparatus in a system including the server and the client apparatus. Alternatively, when there is a third apparatus (e.g., a smartphone) communicating with the server or the client apparatus, the computer program product may include a storage medium of the third apparatus. Alternatively, the computer program product may include an S/W program itself transmitted from the server to the client apparatus or the third apparatus or from the third apparatus to the client apparatus.

In this case, one of the server, the client apparatus, and the third apparatus may execute a method according to the embodiments by executing the computer program product.

Alternatively, at least two of the server, the client apparatus, and the third apparatus may execute a method according to the embodiments of the disclosure in a distributed fashion by executing the computer program product.

For example, the server (e.g., a cloud server or an AI server) may execute the computer program product stored in the server, and may control the client apparatus connected (directly or indirectly) to the server through communication to perform a method according to the embodiments of the disclosure.

While the embodiments of the disclosure have been described in detail, the scope of the disclosure is not limited thereto, and it will be understood by those of ordinary skill in the art that various changes in form and details may be made therein without departing from the spirit and scope as defined by the following claims.

The invention claimed is:

1. A display apparatus comprising:
   a camera;
   a display;
   a memory storing one or more instructions; and
   at least one processor comprising processing circuitry, the at least one processor, individually and/or collectively, configured to execute the one or more instructions stored in the memory to:
   detect a user included in an image captured by the camera;
   detect a free space surrounding the user in the image captured by the camera based on the detecting of the user;
   determine exercise motions performable in the free space, based on the detected free space;
   based on there being no exercise motion performable in the detected free space or a number of exercise motions performable in the detected free space being less than a preset number of exercise motions, control the display to display a guide screen for obtaining additional space, wherein the guide screen includes an image captured by the camera with an indication of the detected free space and an indication of the additional space; and
   based on the number of exercise motions performable in the detected free space being equal to or greater than the preset number, control the display to output exercise content based on the determined exercise motions.

2. The display apparatus of claim 1, wherein the at least one processor is configured to execute the one or more instructions stored in the memory to control the camera to capture an image based on an input for executing an exercise application and/or a user input for selecting an exercise course.

3. The display apparatus of claim 1, wherein the at least one processor is configured to execute the one or more instructions stored in the memory to:
   receive a user input for selecting an exercise course, and
   determine an exercise motion performable in the detected free space, from among exercise motions included in the exercise course selected based on the user input.

4. The display apparatus of claim 1, wherein the at least one processor is configured to execute the one or more instructions stored in the memory to:
   based on the number of exercise motions performable in the detected free space being equal to or greater than the preset number, control the display to output a list including exercise motions included in a selected exercise course, wherein the exercise motions in the list include one or more performable exercise motions within the detected free space and one or more unperformable exercise motions within the detected free space.

5. The display apparatus of claim 1, wherein the at least one processor is configured to execute the one or more instructions stored in the memory to detect the free space included in the captured image, by using a neural network.

6. The display apparatus of claim 1, wherein the guide screen comprises an object for selecting an exercise course.

7. The display apparatus of claim 1, wherein the guide screen comprises a time indicating when the display of the guide screen will end.

8. The display apparatus of claim 6, wherein the at least one processor is configured to execute the one or more instructions stored in the memory to:
   when there is no exercise motion performable in the detected free space or the number of exercise motions performable is less than the preset number, display the guide screen without reproduce the exercise content and control the camera to capture an image at a certain interval,
   when a free space detected in the image captured by the camera at the certain interval includes the additional space, reproduce the exercise content without displaying the guide screen.

9. The display apparatus of claim 1, wherein the at least one processor is configured to execute the one or more instructions stored in the memory to:
   determine an exercise course including the determined exercise motion, and
   control the display to display information about the determined exercise course.

10. The display apparatus of claim 1, wherein the at least one processor is configured to execute the one or more instructions stored in the memory to:
    obtain body type information about the user based on the image captured by the camera,
    select an exercise course based on the body type information about the user, and
    determine an exercise motion performable in the detected free space, from among exercise motions included in the selected exercise course.

11. The display apparatus of claim 1, wherein the at least one processor is configured to execute the one or more instructions stored in the memory to:
    control the display to output the exercise content,
    receive an image of the user while the exercise content is output, the image being captured by the camera,
    analyze a posture and/or a motion of the user based on the image of the user, and
    provide coaching information based on a result of the analyzing of the posture and/or the motion of the user.

12. An operating method of a display apparatus, the method comprising:
    receiving an image captured by a camera;
    detecting a user included in the image;
    detecting a free space surrounding the user in the image;
    determining exercise motions performable in the free space, based on the detected free space;
    based on there being no exercise motion performable in the detected free space or a number of exercise motions performable in the detected free space being less than a preset number of exercise motions, controlling the display to display a guide screen for obtaining additional space, wherein the guide screen includes an image captured by the camera with an indication of the detected free space and an indication of the additional space; and based on the number of exercise motions performable in the detected free space being equal to or greater than the preset number, providing exercise content based on the determined exercise motions.

13. The operating method of claim 12, wherein the receiving of the image captured by the camera comprises receiving the image captured by the camera based an input for executing an exercise application and/or a user input for selecting an exercise course.

14. The operating method of claim 12, further comprising receiving a user input for selecting an exercise course, and wherein the determining of the exercise motion performable in the free space comprises determining an exercise motion performable in the detected free space, from among exercise motions included in the exercise course selected based on the user input.

15. The operating method of claim 12, further comprising based on the number of exercise motions performable in the detected free space being equal to or greater than the preset number, controlling the display to output a list including exercise motions included in a selected exercise course, wherein the exercise motions in the list include one or more performable exercise motions within the detected free space and one or more unperformable exercise motions within the detected free space.

16. The operating method of claim 12, wherein the detecting of the free space comprises detecting the free space included in the captured image, by using a neural network.

17. The operating method of claim 12, wherein the guide screen comprises an object for selecting an exercise course.

18. The operating method of claim 17, wherein the guide screen comprises a time indicating when the display of the guide screen will end.

19. The operating method of claim 17, further comprising, when there is no exercise motion performable in the detected free space or the number of exercise motions performable is less than the preset number, displaying the guide screen without reproduce the exercise content and capturing, by the camera, an image at a certain interval, and wherein the providing of the exercise content comprises, when a free space detected in the image captured by the camera at the certain interval includes the additional space, reproducing the exercise content without displaying the guide screen.

20. A non-transitory computer-readable recording medium storing therein a program for executing the method of claim 12.

21. The display apparatus of claim 1, wherein the additional space includes a space that is adjacent to the detected free space and is required with the detected free space for performing additional exercise motions.

22. The operating method of claim 12, wherein the additional space includes a space that is adjacent to the detected free space and is required with the detected free space for performing additional exercise motions.

* * * * *